US 007849048B2

(12) United States Patent
Langseth et al.

(10) Patent No.: US 7,849,048 B2
(45) Date of Patent: Dec. 7, 2010

(54) SYSTEM AND METHOD OF MAKING UNSTRUCTURED DATA AVAILABLE TO STRUCTURED DATA ANALYSIS TOOLS

(75) Inventors: Justin Langseth, Great Falls, VA (US); Nithi Vivatrat, Great Falls, VA (US); Gene Sohn, North Potomac, MD (US)

(73) Assignee: Clarabridge, Inc., Falls Church, VA (US)

( * ) Notice: Subject to any disclaimer, the term of this patent is extended or adjusted under 35 U.S.C. 154(b) by 183 days.

(21) Appl. No.: 11/172,955

(22) Filed: Jul. 5, 2005

(65) Prior Publication Data
US 2007/0011134 A1  Jan. 11, 2007

(51) Int. Cl.
*G06F 7/00* (2006.01)
*G06F 17/00* (2006.01)

(52) U.S. Cl. .................... 707/602; 707/912
(58) Field of Classification Search .............. 707/3
See application file for complete search history.

(56) References Cited

U.S. PATENT DOCUMENTS

| | | | |
|---|---|---|---|
| 4,652,733 A | | 3/1987 | Eng et al. |
| 4,871,903 A | | 10/1989 | Carrell |
| 5,162,992 A | | 11/1992 | Williams |
| 5,361,353 A | | 11/1994 | Carr et al. |
| 5,567,865 A | * | 10/1996 | Hauf ..................... 73/28.01 |
| 5,608,904 A | | 3/1997 | Chaudhuri et al. |
| 5,640,575 A | | 6/1997 | Maruyama et al. |
| 5,664,109 A | | 9/1997 | Johnson et al. |
| 5,708,825 A | * | 1/1998 | Sotomayor ............. 715/501.1 |
| 5,768,578 A | | 6/1998 | Kirk et al. |
| 5,819,265 A | | 10/1998 | Ravin et al. |
| 5,983,214 A | | 11/1999 | Lang et al. |

(Continued)

FOREIGN PATENT DOCUMENTS

DE  10337934  8/2004

(Continued)

OTHER PUBLICATIONS

Nagao et al., "Automatic Text Summarization Based on the Global Document Annotation," International Conference on Computational Linguistics Proceedings, 1998, vol. 2, p. 917-921.*

(Continued)

*Primary Examiner*—Pierre M Vital
*Assistant Examiner*—Rachel J Lee
(74) *Attorney, Agent, or Firm*—Michele V. Frank; Patton Boggs LLP

(57) ABSTRACT

A system and method of making unstructured data available to structured data analysis tools. The system includes middleware software that can be used in combination with structured data tools to perform analysis on both structured and unstructured data. Data can be read from a wide variety of unstructured sources. The data may then be transformed with commercial data transformation products that may, for example, extract individual pieces of data and determine relationships between the extracted data. The transformed data and relationships may then be passed through an extraction/transform/load (ETL) layer and placed in a structured schema. The structured schema may then be made available to commercial or proprietary structured data analysis tools.

35 Claims, 10 Drawing Sheets

U.S. PATENT DOCUMENTS

| | | | |
|---|---|---|---|
| 6,009,462 A * | 12/1999 | Birrell et al. | 709/206 |
| 6,052,693 A | 4/2000 | Smith et al. | |
| 6,061,678 A | 5/2000 | Klein et al. | |
| 6,078,924 A | 6/2000 | Ainsbury et al. | |
| 6,151,604 A | 11/2000 | Wlaschin et al. | |
| 6,163,775 A | 12/2000 | Wlaschin et al. | |
| 6,236,994 B1 | 5/2001 | Swartz et al. | |
| 6,332,163 B1 * | 12/2001 | Bowman-Amuah | 709/231 |
| 6,363,379 B1 | 3/2002 | Jacobson et al. | |
| 6,366,921 B1 | 4/2002 | Hansen et al. | |
| 6,449,620 B1 * | 9/2002 | Draper et al. | 707/102 |
| 6,564,215 B1 | 5/2003 | Hsiao et al. | |
| 6,629,097 B1 | 9/2003 | Keith et al. | |
| 6,643,661 B2 | 11/2003 | Polizzi | |
| 6,665,685 B1 * | 12/2003 | Bialic | 707/102 |
| 6,694,307 B2 | 2/2004 | Julien | |
| 6,728,707 B1 | 4/2004 | Wakefield et al. | |
| 6,732,097 B1 | 5/2004 | Wakefield et al. | |
| 6,732,098 B1 | 5/2004 | Wakefield et al. | |
| 6,735,578 B2 | 5/2004 | Shetty et al. | |
| 6,738,765 B1 | 5/2004 | Wakefield et al. | |
| 6,741,988 B1 | 5/2004 | Wakefield et al. | |
| 6,862,585 B2 | 3/2005 | Planalp et al. | |
| 6,886,010 B2 | 4/2005 | Kostoff | |
| 6,912,498 B2 * | 6/2005 | Stevens et al. | 704/235 |
| 6,970,881 B1 * | 11/2005 | Mohan et al. | 1/1 |
| 7,043,535 B2 | 5/2006 | Chi et al. | |
| 7,191,183 B1 * | 3/2007 | Goldstein | 707/101 |
| 7,536,413 B1 * | 5/2009 | Mohan et al. | 1/1 |
| 2001/0018686 A1 | 8/2001 | Nakano et al. | |
| 2001/0025353 A1 | 9/2001 | Jakel | |
| 2002/0065857 A1 | 5/2002 | Michalewicz et al. | |
| 2002/0078068 A1 | 6/2002 | Krishnamurthy et al. | |
| 2002/0111951 A1 | 8/2002 | Zeng | |
| 2002/0128998 A1 | 9/2002 | Kil et al. | |
| 2002/0129011 A1 | 9/2002 | Julien | |
| 2002/0143875 A1 * | 10/2002 | Ratcliff, III | 709/205 |
| 2002/0152208 A1 | 10/2002 | Bloedorn | |
| 2002/0156771 A1 | 10/2002 | Frieder et al. | |
| 2002/0161626 A1 | 10/2002 | Plante et al. | |
| 2002/0168664 A1 | 11/2002 | Murray et al. | |
| 2002/0194379 A1 | 12/2002 | Bennett et al. | |
| 2003/0014406 A1 | 1/2003 | Faieta et al. | |
| 2003/0033275 A1 | 2/2003 | Alpha et al. | |
| 2003/0078766 A1 * | 4/2003 | Appelt et al. | 704/9 |
| 2003/0083908 A1 | 5/2003 | Steinmann | |
| 2003/0088562 A1 | 5/2003 | Dillon et al. | |
| 2003/0110058 A1 | 6/2003 | Fagan et al. | |
| 2003/0120133 A1 | 6/2003 | Rao et al. | |
| 2003/0125988 A1 | 7/2003 | Rao et al. | |
| 2003/0130894 A1 | 7/2003 | Huettner et al. | |
| 2003/0144892 A1 | 7/2003 | Cowan et al. | |
| 2003/0149586 A1 | 8/2003 | Chen et al. | |
| 2003/0149730 A1 | 8/2003 | Kumar et al. | |
| 2003/0158865 A1 | 8/2003 | Renkes et al. | |
| 2003/0176976 A1 | 9/2003 | Gardner | |
| 2003/0177112 A1 | 9/2003 | Gardner | |
| 2003/0177143 A1 | 9/2003 | Gardner | |
| 2003/0204494 A1 | 10/2003 | Agrawal et al. | |
| 2003/0206201 A1 | 11/2003 | Ly | |
| 2003/0225749 A1 | 12/2003 | Cox et al. | |
| 2004/0010491 A1 | 1/2004 | Riedinger | |
| 2004/0044659 A1 | 3/2004 | Russell et al. | |
| 2004/0049473 A1 | 3/2004 | Gower et al. | |
| 2004/0049505 A1 | 3/2004 | Pennock et al. | |
| 2004/0103116 A1 | 5/2004 | Palanisamy et al. | |
| 2004/0111302 A1 | 6/2004 | Falk et al. | |
| 2004/0167870 A1 | 8/2004 | Wakefield et al. | |
| 2004/0167883 A1 | 8/2004 | Wakefield et al. | |
| 2004/0167884 A1 | 8/2004 | Wakefield et al. | |
| 2004/0167885 A1 | 8/2004 | Wakefield et al. | |
| 2004/0167886 A1 | 8/2004 | Wakefield et al. | |
| 2004/0167887 A1 | 8/2004 | Wakefield et al. | |
| 2004/0167907 A1 | 8/2004 | Wakefield et al. | |
| 2004/0167908 A1 | 8/2004 | Wakefield et al. | |
| 2004/0167909 A1 | 8/2004 | Wakefield et al. | |
| 2004/0167910 A1 | 8/2004 | Wakefield et al. | |
| 2004/0167911 A1 | 8/2004 | Wakefield et al. | |
| 2004/0172297 A1 | 9/2004 | Rao et al. | |
| 2004/0186826 A1 * | 9/2004 | Choi et al. | 707/3 |
| 2004/0194009 A1 | 9/2004 | LaComb et al. | |
| 2004/0215634 A1 | 10/2004 | Wakefield et al. | |
| 2004/0225653 A1 | 11/2004 | Nelken et al. | |
| 2004/0243554 A1 | 12/2004 | Broder et al. | |
| 2004/0243560 A1 | 12/2004 | Broder et al. | |
| 2004/0243645 A1 | 12/2004 | Broder et al. | |
| 2005/0004909 A1 * | 1/2005 | Stevenson et al. | 707/5 |
| 2005/0010454 A1 | 1/2005 | Falk et al. | |
| 2005/0015381 A1 | 1/2005 | Clifford et al. | |
| 2005/0038805 A1 | 2/2005 | Maren et al. | |
| 2005/0049497 A1 | 3/2005 | Krishnan et al. | |
| 2005/0050037 A1 | 3/2005 | Frieder et al. | |
| 2005/0055355 A1 | 3/2005 | Murthy et al. | |
| 2005/0059876 A1 | 3/2005 | Krishnan et al. | |
| 2005/0065807 A1 | 3/2005 | Deangelis et al. | |
| 2005/0065941 A1 | 3/2005 | Deangelis et al. | |
| 2005/0065967 A1 | 3/2005 | Schuetze et al. | |
| 2005/0086215 A1 | 4/2005 | Perisic | |
| 2005/0086222 A1 | 4/2005 | Wang et al. | |
| 2005/0091285 A1 | 4/2005 | Krishnan et al. | |
| 2005/0108256 A1 | 5/2005 | Wakefield et al. | |
| 2005/0108267 A1 | 5/2005 | Gibson et al. | |
| 2005/0165712 A1 | 7/2005 | Araki et al. | |
| 2005/0243604 A1 * | 11/2005 | Harken et al. | 365/185.22 |
| 2006/0253495 A1 * | 11/2006 | Png | 707/200 |
| 2007/0011175 A1 | 1/2007 | Langseth et al. | |

FOREIGN PATENT DOCUMENTS

| | | |
|---|---|---|
| EP | 1083491 A2 | 3/2001 |
| JP | 1021249 | 1/1989 |
| JP | 2004258912 | 9/2004 |
| WO | WO 96/30845 | 3/1996 |
| WO | WO 98/35469 | 8/1998 |
| WO | WO 02/095616 A1 | 11/2002 |
| WO | WO 03/004892 A2 | 5/2003 |
| WO | WO 03/040878 A2 | 5/2003 |
| WO | WO 03/098466 A1 | 11/2003 |
| WO | WO 2004/104865 A2 | 2/2004 |
| WO | WO 2007/005730 | 1/2007 |
| WO | WO 2007/005732 | 1/2007 |

OTHER PUBLICATIONS

Tkach, Daniel S., "Information Mining with the IBM Intelligent Miner Family," IBM, 1998.*

Embley et al., "Ontology-Based Extraction and Structuring of Information form Data-Rich Unstructured Documents," In Proceedings of the Conference on Information and Knowledge Management (CIKM'98), 1998.*

Vesset et al., "White Paper: Why Consider Oracle for Business Intelligence?" IDC, 2004.*

XSLT, "XSL Transformations (XSLT) Version 1.0," W3C, 1999.*

Hearst, Marti A., "Untangling Text Data Mining," Proceeding of the 37th annual meeting of the Association for Computational Linguistics on Computational Linguistics, 1999.*

Russom, Philip, "How to Evaluate Enterprise ETL," Tech Choices, 2004.*

Patro et al., "Seamless Integration of Diverse Types into Exploratory Visualization Systems," Eurographics, 2003.*

Hu et al., "Mining Opinion Features in Customer Reviews," American Association for Artificial Intelligence, 2004.*

Gamon et al., "Pulse: Mining Customer Opinions from Free Text," Springer-Verlag Berline Heidelberg, 2005.*

Kim et al., "Determining the Sentiment of Opinions," ACM, 2004.*

Alani et al., "Automatic Ontology-Based Knowledge Extraction from Web Documents," IEEE Computer Society, 2003.*

Park et al., "Co-trained support vector machines for large scale unstructured document classification using unlabeled data and syntactic information," Information Processing and Management, 2004.*

Moschitti et al., "Open Domain Information Extraction via Automatic Semantic Labeling," American Association for Artificial Intelligence, 2003.*

Pradhan et al., "Semantic Role Parsing: Adding Semantic Structure to Unstructured Text," Proceedings of the Third IEEE International Conference on Data Mining (ICDM'03), 2003.*

"Adding Structure to the Unstructured-Computer Business Review;", http://www.cbr-online.com, World Wide Web, May 25, 2005, pp. 1-6.

Alfred Z. Spector, "Architecting Knowledge Middleware;", http://itlab.uta.edu/idm01/FinalReports/Innovation.pdf, World Wide Web, 2002, pp. 1-40.

M. Ghanem et. al., "Dynamic Information Integration for E-Science", http://www.discovery-on-the.net/documents/DynamicInformationIntegration.pdf>, World Wide Web, pp. 1-2.

Aaron Zornes, "EA Community Articles", http://www.eacommunity.com/articles/openarticle.asp?ID=1834>, World Wide Web, May 25, 2005, pp. 1-3.

Beth Gold-Bernstein, "EbizQ Integration Conference", http://www.ebizq.net/topics/portals/features/4371.html?page=2&pp=1>, World Wide Web, May 10, 2005, pp. 1-5.

"EIQ Server", http://www.whamtech.com/eiq_server.htm>, World Wide Web, May 25, 2005, pp. 1-3.

"GEDDM-Grid Enabled Distributed Data Mining", http://www.qub.ac.uk/escience/projects/geddm/geddm_handout.pdf, World Wide Web, pp. 1-2.

Stephen Swoyer, "IBM's BI Middleware Play: Its All About Integration, Partnerships", http://www.tdwi.org/Publications/display.aspx?id+7267&t=y, World Wide Web, Nov. 3, 2004, pp. 1-3.

Barbara Darrow, "IBM Looks to 'Viper' Database to Combat Oracle, Microsoft", http://www.bizintellignecepipeline.com/shared/article/printable.ArticleSrc.Jhtml, World Wide Web, May 25, 2005, pp. 1-5.

Min Wang et. al., "Database Research at Watson", http://www.research.ibm.com/scalabledb/semistruct.html, World Wide Web, May 25, 2005, pp. 1-3.

Infoconomy Staff, "Enterprise Search Tools", http://www.infoconomy.com/pages/infoconomist-crib-sheets/group101866.adp, World Wide Web, Dec. 1, 2004, pp. 1-5.

"Innovative Applications;", http://www2002.ore/soector.pdg, World Wide Web, pp. 1-5.

D. Ferrucci, "Building An Example Application With the Unstructured Information Management Architecture", http://www.findarticles.com/p/articles/mi_mISJ/is_3_43/ai_n7576557/print, World Wide Web, Mar. 16, 2004, pp. 1-22.

Robert Bourret, "Persistence: SGML and XML in Databases", http://www.isgmlug.org/database.html, World Wide Web, 2002, pp. 1-5.

Robert D. Kugel, "Transform Magazine: Unstructured Information Management", http://www.transformmag.com/shard/cp/print_article.jthml;sessionid.>, World Wide Web, Dec. 2003, pp. 1-3.

"The Unstructured Information Management Architecture Project", http://www.research.ibm.com/UIMA/>, World Wide Web, May 25, 2005, pp. 1-2.

Penny Lunt Lunt Crosman, "Content Pipeline", http://messagingpipeline.com/shared/article/printableArticleSrc.jhtml?articleId=51201811>, World Wide Web, Nov. 1, 2004, pp. 1-8.

International Search Report for PCT/US06/25811, filed Feb. 16, 2007.

International Search Report and Written Opinion for PCT/US06/25811, filed Feb. 16, 2007 (11 pages).

International Search Report mailed Jul. 27, 2007, for corresponding PCT Application No. PCT/US2006/25810.

In the U.S. Patent and Trademark Office, Non-Final Office Action in re: U.S. Appl. No. 11/172,956, dated Apr. 28, 2009, 28 pages.

In the U.S. Patent and Trademark Office, Final Office Action in re: U.S. Appl. No. 11/172,956, dated May 30, 2008, 27 pages.

In the U.S. Patent and Trademark Office, Examiner Interview Summary in re: U.S. Appl. No. 11/172,956, dated Jan. 28, 2008, 3 pages.

In the U.S. Patent and Trademark Office, Non-Final Office Action in re: U.S. Appl. No. 11/172,956, dated Aug. 8, 2007, 26 pages.

Agrawal et al., "Athena: Mining-Based Interactive Management of Text Databases," 2000, *EDBT, LNCS 1777*, 365-379.

Zheng, "Tradeoffs in Certificate Revocation Schemes," Apr. 2003, *ACM SIGCOMM Computer Communications Review*, 33:2:103-112.

Kelly et al., "Roadmap to checking data migration," 2003, *Elsevier*, 506-510.

Keogh et al., "On the Need for Time Series Data Mining Benchmarks: A survey and Empirical Demonstration," 2003, *Data Mining and Knowledge Discovery*, 7:349-371.

Ma et al., "Extracting Unstructured Data from Template Generated Web Documents," 2003, *CIKM*, 512-515.

\* cited by examiner

| Company | SIC Code | Metrics | %Variance %Loans vs. #Loans vs. Industry | Rank %Variance #Loan vs Industry | %Variance %Loans vs. Industry | Rank %Variance %Loans vs. Industry | Loan $ as % of Market | Rank Loan $ as % CapMktCapScore) | RPT Risk ScoreScore) | Rank (RPT Risk |
|---|---|---|---|---|---|---|---|---|---|---|
| COPPER MOUNTAIN NETWORKS INC | 3661 | Telephone & Telegraph Apparatus | 866.67% | 21 | 761.90% | 4 | 9.327% | 6 | 31 | 1 |
| NETWORK ENGINES INC | 7372 | Services-Prepackaged Software | 1237.50% | 5 | 339.01% | 19 | 6.139% | 9 | 33 | 2 |
| RESOURCE AMERICA INC | 1311 | Crude Petroleum & Natural Gas | 1163.64% | 6 | 244.63% | 34 | 28.328% | 3 | 43 | 3 |
| INTERNET CAPITAL GROUP INC | 7389 | Services-Business Services, NEC | 1341.67% | 4 | 251.75% | 33 | 5.261% | 12 | 49 | 4 |
| MERCURY INTERACTIVE CORPORATION | 7372 | Services-Prepackaged Software | 1350.00% | 3 | 335.16% | 20 | 0.451% | 31 | 54 | 5 |
| SUNRISE TELECOM INC | 4813 | Communications (No Radiotelephone) Telephone | 800.00% | 22 | 305.56% | 24 | 3.046% | 13 | 59 | 6 |
| CYPRESS SEMICONDUCTOR CORP /DE/ | 3674 | Semiconductors & Related Devices | 1138.89% | 7 | 1178.57% | 2 | 0.087% | 51 | 60 | 7 |
| ESPEY MFG & ELECTRONICS CORP | 3679 | Electronic Components, NEC | 700.00% | 29 | 225.00% | 38 | 48.289% | 2 | 69 | 8 |
| ARK RESTAURANTS CORP | 5812 | Retail-Eating Places | 1066.67% | 9 | 253.33% | 31 | 0.399% | 33 | 73 | 9 |

SYSTEM AND METHOD OF MAKING UNSTRUCTURED DATA AVAILABLE TO STRUCTURED DATA ANALYSIS TOOLS

RELATED APPLICATIONS

This application is related to applications "Schema and ETL Tools for Structured and Unstructured Data" and "Analysis and Transformation Tools for Structured and Unstructured Data," filed even date herewith.

FIELD OF THE INVENTION

The present invention is directed generally to software for data analysis and specifically to a middleware software system that allows structured data tools to operate on unstructured data.

BACKGROUND OF THE INVENTION

Roughly 85% of corporate information and 95% of global information is unstructured. This information is commonly stored in text documents, emails, spreadsheets, internet web pages and, similar sources. Further, this information is stored in a large variety of formats such as plain text, PDF, bitmap, ASCII, and others.

To analyze and evaluate unstructured information, there are a limited number of tools with limited capabilities. These tools can be categorized into four distinct groups of tools. These are (1) entity, concept and relationship tagging and extraction tools, (2) enterprise content management and knowledge management tools, (3) enterprise search categorization tools, and (4) document management systems.

Entity extraction tools search unstructured text for specific types of entities (people, places, organizations). These tools identify in which documents the terms were found. Some of these tools can also extract relationships between the identities. Entity extraction tools are typically used to answer questions such as "what people are mentioned in a specific document?" "what organizations are mentioned in the specific document?" and "how are the mentioned people related to the mentioned organizations?"

Enterprise content/knowledge management tools are used to organize documents into folders and to share information. They also provide a single, one-stop access point to look for information. Enterprise tools can be used to answer questions such as "what documents do I have in a folder on a particular terrorist group?" and "who in my organization is responsible for tracking information relating to a particular terrorist group?"

Enterprise search and categorization tools allow key word searching, relevancy ranking, categorization by taxonomy, and guided navigation. These tools are typically used to find links to sources of information. Example questions such tools can answer include "show me links to documents containing the name of a particular terrorist" and "show me links to recent news stories about Islamic extremism."

Document management tools are used to organize documents, control versioning and permissioning, and to control workflow. These tools typically have basic search capabilities. Document management tools can used to answer questions such as "where are my documents from a particular analysis group?" and "which documents have been put in a particular folder?"

In contrast to unstructured or freeform information, structured data is organized with very definite relationships between the various data. These relationships can be exploited by structured data analysis tools to provide valuable insights into the operation of a company or organization and to guide management into making more intelligent decisions. Structured data analysis tools include (1) business intelligence tools, (2) statistical analysis tools, (3) visualizations tools, and (4) data mining tools.

Business intelligence tools include dashboards, the ability to generate reports, ad-hoc analysis, drill-down, and slice and dice. These tools are typically used to analyze how data is changing over time. They also have the ability to see how products or other items are related to each other. For example, a store manager can select an item and query what other items are frequently purchased with that item.

Statistical analysis tools can be used to detect fraud, check quality control, fit-to-pattern analysis, and optimization analysis. Typical questions these tools are used to answer include "what is the average daily network traffic and standard deviation?" "what combination of factors typically indicate fraud?" "How can I minimize risk of a financial portfolio?" and "which of my customers are the most valuable?"

Visualization tools are designed to display data graphically, especially in conjunction with maps. With these tools one can visually surf and/or navigate though their data, overlay and evaluate data on maps with a geographic information system (GIS), and perform link and relationship analysis. These tools can be used, for example, to show trends and visually highlight anomalies, show a map color-coded by crime rate and zip code, or answer the question "who is connected by less than 3 links to a suspicious group?"

Data mining tools are typically used for pattern detection, anomaly detection, and data prediction. Example question that can be addressed with these tools are "what unusual patterns are present in my data?" "which transactions may be fraudulent?" and "which customers are likely to become high-value in the next 12 months?"

Tools for analyzing structured data are far more flexible and powerful than the current tools used to analyze unstructured data. However, the overwhelming majority of all data is unstructured. Therefore it would be advantageous to have a middleware system and method that allows structured data analysis tools to operate on unstructured data.

SUMMARY OF THE INVENTION

The present invention provides a system and method making unstructured data available to structured data tools. The invention provides middleware software system that can be used in combination with structured data tools to perform analysis on both structured and unstructured data. The invention can read data from a wide variety of unstructured sources. This data may then be transformed with commercial data transformation products that may, for example, extract individual pieces of data and determine relationships between the extracted data. The transformed data and relationships may then be passed through an extraction/transform/load (ETL) layer and placed in a structured schema. The structured schema may then be made available to commercial or proprietary structured data analysis tools.

One embodiment of the present invention provides a method of making unstructured data available to structured data tools comprising accessing a source of unstructured data; extracting the unstructured data; writing the extracted unstructured data to a capture schema; sending the unstructured data to a transformation tool; transforming the unstructured data with the transformation tool; writing the transformed parsed unstructured data in a structured analysis schema; providing data connectors that allow structured data analysis tools to access the structured analysis schema.

In one aspect of the invention, extracting includes parsing the unstructured data and associating the data source with the parsed unstructured data. In another aspect of the invention, the transformation tool extracts individual pieces of data and performs text and/or data processing activities. In another aspect of the invention, the text and data processing activities include: determining the topic of a section of text, extracting a section of text from a whole document, matching names, or matching addresses. In another aspect of the invention, the structured data tools include business intelligence, statistical analysis, data visualization and mapping, or data mining. In another aspect of the invention, the source of unstructured data includes email, word processing documents, spreadsheets, presentation materials, PDF files, web pages, news/media reports, case files, transcriptions, file servers, web servers, enterprise content, enterprise search tool repositories, intranets, knowledge management systems, or document management systems. In another aspect of the invention, the transformation tool includes: (i) entity, concept and relationship tagging and extraction tools, (ii) categorization and topic extraction tools, (iii) data matching tools or, (iv) custom transformations.

Another embodiment the present invention provides a system for making unstructured data available to structured data tools comprising code to access a source of unstructured data; code to extract the unstructured data; code to write the extracted unstructured data to a capture schema; code to send the unstructured data to a transformation tool; code to transform the unstructured data with the transformation tool; code to write the transformed parsed unstructured data in a structured analysis schema; code to provide data connectors that allow structured data analysis tools to access the structured analysis schema.

In one aspect of the invention, the code to extract includes code to parse the unstructured data and associate the data source with the parsed unstructured data. In another aspect of the invention, transformation tool extracts individual pieces of data and performs text and/or data processing activities. In another aspect of the invention, the text and data processing activities include: determining the topic of a section of text, extracting a section of text from a whole document, matching names, or matching addresses. In another aspect of the invention, the structured data tools include business intelligence, statistical analysis, data visualization and mapping, or data mining. In another aspect of the invention, the source of unstructured data includes email, word processing documents, spreadsheets, presentation materials, PDF files, web pages, news/media reports, case files, transcriptions, file servers, web servers, enterprise content, enterprise search tool repositories, intranets, knowledge management systems, or document management systems. In another aspect of the invention, the transformation tool includes: (i) entity, concept and relationship tagging and extraction tools, (ii) categorization and topic extraction tools, (iii) data matching tools or, (iv) custom transformations.

Another embodiment the present invention provides an extraction service for extracting unstructured data from a plurality of unstructured data sources and a plurality of formats comprising a plurality of APIs to interface with the plurality of unstructured data sources; and a single internal API that interfaces with a plurality of software components that allow structured data analysis tools to operate on unstructured data.

In one aspect of the invention, the plurality of unstructured data sources includes email, word processing documents, spreadsheets, presentation materials, PDF files, web pages, news/media reports, case files, transcriptions, file servers, web servers, enterprise content, enterprise search tool repositories, intranets, knowledge management systems, and document management systems.

Another embodiment the present invention provides a transformation connector comprising code capable of understanding the format of data provided by a transformation tool; and code to convert the data provided by a transformation tool to a data format that maps to a data capture schema, the data capture schema comprising; a table to store data extracted from a plurality of source documents having unstructured data; and a table to store information about the extracted data, wherein the plurality of documents are assigned a unique key that identifies the document throughout a software system allowing (i) cross-analysis, (ii) linking of results for further analysis, (iii) drill-down from analytical reports back to the source documents, or (iv) drill-down from analytical reports back to transformation information stored in the schema.

In one aspect of the invention, the transformation tool includes: (i) entity, concept and relationship tagging and extraction tools, (ii) categorization and topic extraction tools, (iii) data matching tools or, (iv) custom transformations. In another aspect of the invention, the code to convert the data comprises at least one XSL transform.

Another embodiment the present invention provides a core server comprising code to allow parallel processing of unstructured data on a continuous real-time basis, wherein the code is adapted to configure unstructured source extractors and treat them as black boxes in a data workflow; the code is adapted to extract unstructured text from a plurality of data sources and source systems, the extracted unstructured text available for input for further processing; the code is adapted to configure end-to-end data flow from the plurality of data sources through one or more transformation components into a capture schema and into an analysis schema for analysis by structured data analysis tools; the code is adapted to retain a single key for each data source, the key being associated with data generated by the transformation components; and the code is adapted to store all extracted unstructured text, metadata and transformation data in a single schema.

In one aspect of the invention, the code is adapted to use a drag and drop data editor.

Another embodiment the present invention provides a structured data connector that allows structured data analysis tools to analyze data in an analysis schema comprising ODBC code; JDBC code; and code to pre-populate metadata of the structured data analysis tools with tables, columns, attributes, data and metrics from an analysis schema without performing tool customization or application specific setup.

In one aspect of the invention, the structured data connector further comprises pre-built reports, graphs and dashboards. In another aspect of the invention, the structured data connector further comprises embedded hyperlinks that allow drill-through to underlying data sources. In another aspect of the invention, the hyperlinks include a document ID, entity ID, or relationship ID from the analysis schema. In another aspect of the invention, the structured data connector further comprises a source highlighter, the source highlighter adapted to access a capture schema and retrieve a source document or a section of a source document. In another aspect of the invention, the source highlighter is adapted to retrieve start and end character positions, and to scroll down and highlight a relevant sentence in a retrieved source document or in a retrieved section of a source document.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 7 is another screen capture of a report generated by an embodiment of the invention.

FIG. 8 is another screen capture of a report generated by an embodiment of the invention.

FIG. 9 is another screen capture of a report generated by an embodiment of the invention.

FIG. 10 is a screen capture illustrating a feature of one embodiment of the invention.

DETAILED DESCRIPTION OF THE PREFERRED EMBODIMENTS

The present invention is directed to a middleware software system to make unstructured data available to structured data analysis tools. In one aspect of the invention, the middleware software system can be used in combination with structured data analysis tools and methods to perform structured data analysis using both structured and unstructured data. The invention can read data from a wide variety of unstructured sources. This data may then be transformed with commercial data transformation products that may, for example, extract individual pieces of data and determine relationships between the extracted data. The transformed data and relationships are preferably stored in a capture schema, discussed in more detail below. The transformed data and relationships may be then passed through an extraction/transform/load (ETL) layer that extracts and preferably loads the data and relationships in a structured analysis schema, also discussed in more detail below. Structured connectors according to one embodiment of the invention provide structured data analysis tools access to the structured analysis schema.

The present invention enables analysis of unstructured data that is not possible with existing data analysis tools. In particular, the present invention allows, inter alia, (i) multi-dimensional analysis, (ii) time-series analysis, (iii) ranking analysis, (iv) market-basket analysis and, (v) anomaly analysis. Multi-dimensional analysis allows the user to filter and group unstructured data. It also allows drill down into dimensions and the ability to drill across to other dimensions. Time-series analysis allows the user to analyze the genesis of concepts and organizations over time and to analyze how things have increased or decreased over time. Ranking analysis allows the user to rank and order data to determine the highest performing or lowest performing thing being evaluated. It also allows the user to focus analysis on the most critical items. Market-basket analysis allows the user to determine what items or things go with other items or things. It also can allow the user to find unexpected relationships between items. Anomaly analysis allows the user to determine if new events fit historical profiles or it can be used to analyze an unexpected absence or disappearance.

Figure 1:
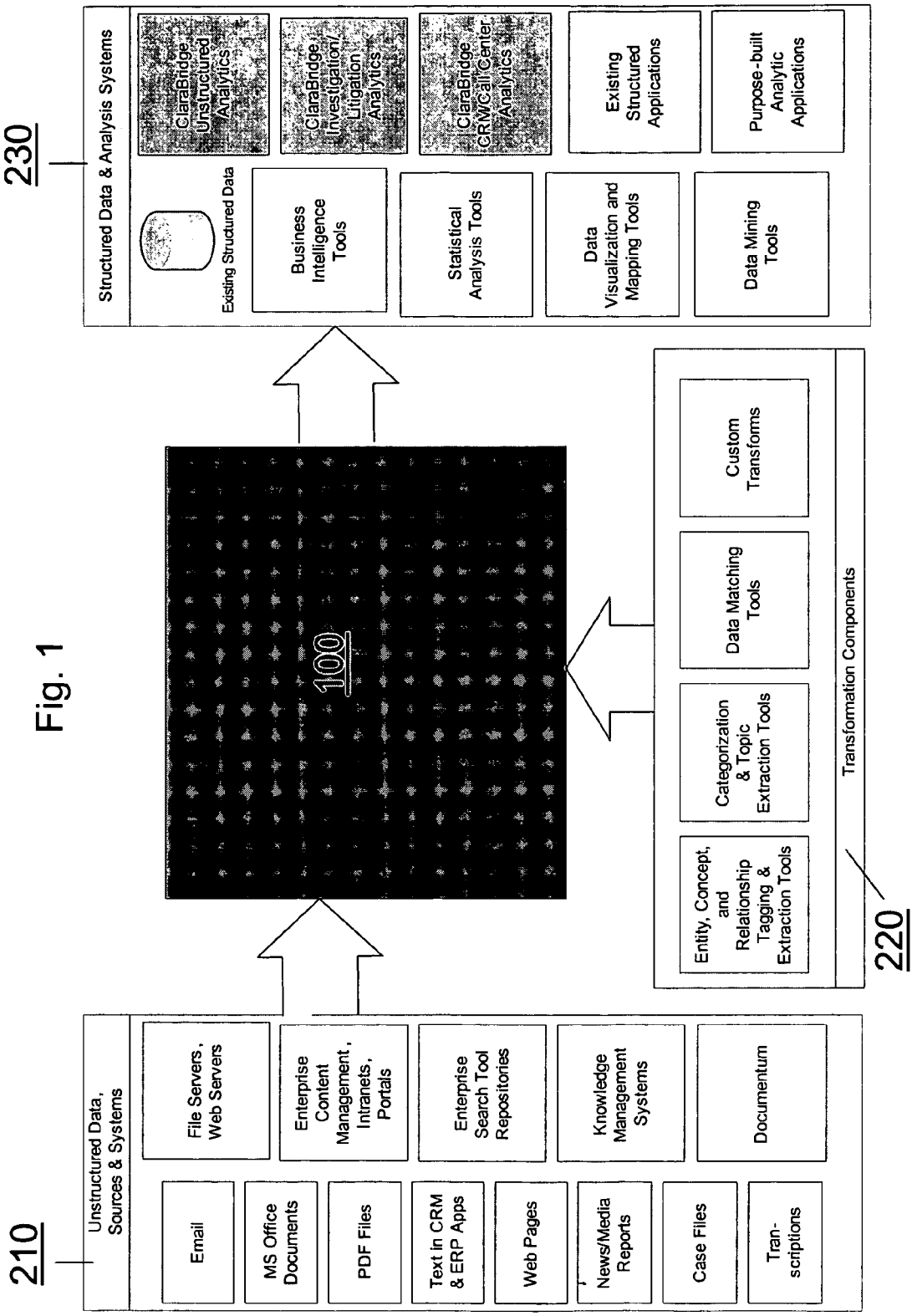
FIG. 1 is a schematic diagram of the system overview of an embodiment of the invention.

FIG. 1 illustrates a schematic of a system overview of one embodiment of the invention. As can be seen from the figure, this embodiment constitutes middleware software system 100. That is, this embodiment allows unstructured data 210 to be accessed and used by structured data tools 230. With this embodiment of the invention, business can use their existing structured data tools 230 to analyze essentially all of their various sources of unstructured data, resulting in a more robust analytic capability.

The unstructured data 210 that can be read by this embodiment of the invention includes, but is not limited to, emails, Microsoft Office™ documents, Adobe PDF files, text in CRM and ERP applications, web pages, news, media reports, case files, and transcriptions. Sources of unstructured data, include, but are not limited to, (i) file servers; (ii) web servers; (ii) enterprise, content, management, and intranet portals; (iii) enterprise search tool repositories; (iv) knowledge management systems; and (v) Documentum™ and other document management systems. The structured data tools 230, include but are not limited to, business intelligence tools, statistical analysis tools, data visualization and mapping tools, and data mining tools. Additionally, custom structured data and analysis tools 230 may be developed and easily integrated with this embodiment of the invention.

The middleware software system 100 of the present embodiment of the invention may also be adapted to access transformation components 220 capable of parsing the unstructured data 210. The transformation components 220, can for example, be used to extract entity and relationship information from the unstructured data 210. Transformation components 220, include but are not limited to: (i) entity, concept and relationship tagging and extraction tools; (ii) categorization and topic extraction tools, (iii) data matching tools, and (iv) custom transformers.

Figure 2:
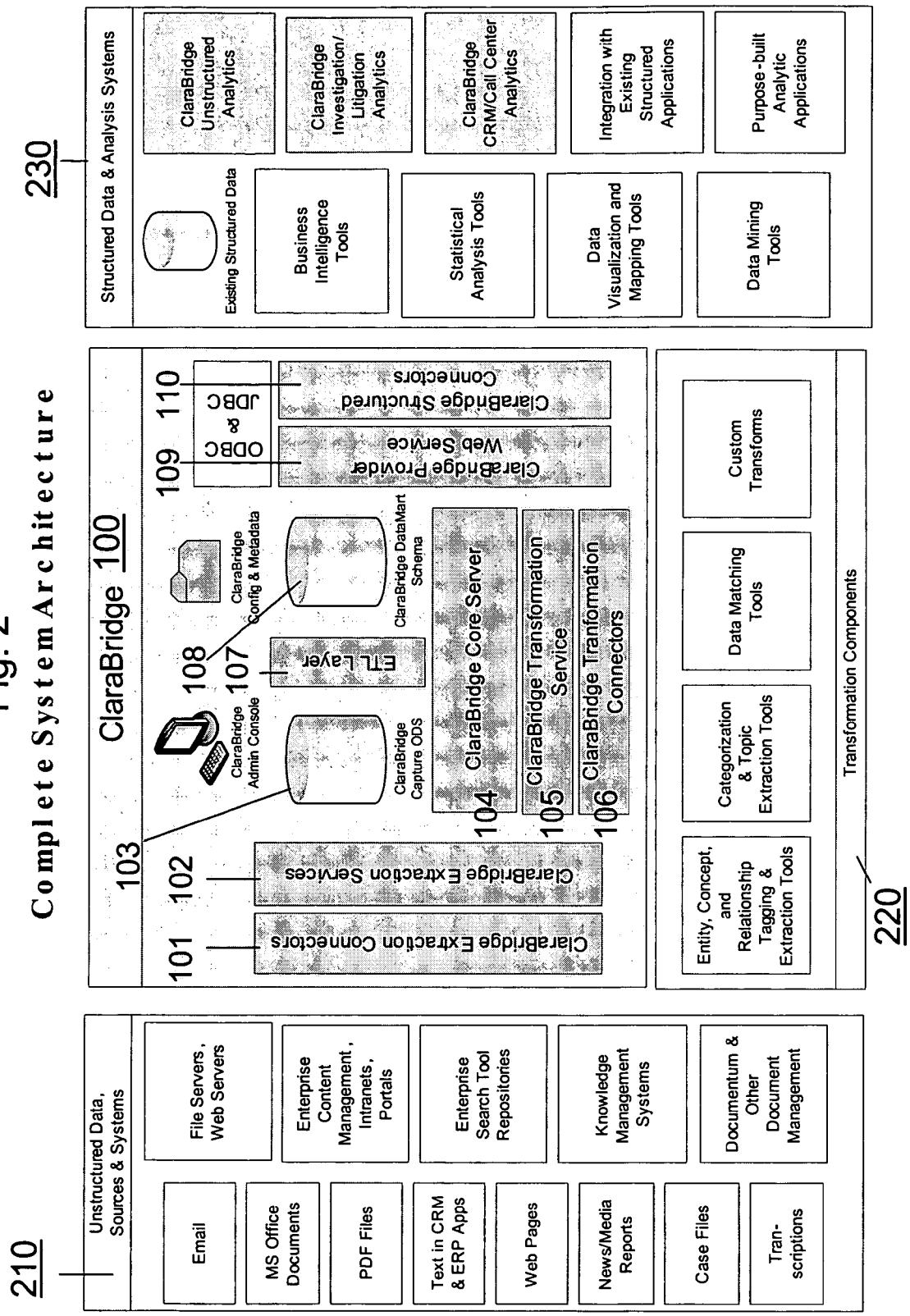
FIG. 2 is a schematic diagram of the system architecture of an embodiment of the invention.

A preferred embodiment of the complete system architecture of middleware software system 100 is illustrated in FIG. 2. This embodiment includes extraction connectors 101 and extraction services 102 for accessing the unstructured data 210. It also includes a capture schema 103 that holds all of the unstructured data 210. This embodiment further includes a core server 104 that coordinates the processing of data, unstructured 210 and structured, throughout the middleware software system 100. This embodiment also includes transformation services 105 and transformation connectors 106 that handle passing unstructured data 210 to and from the transformation components 220. Additionally, the middleware software system 100 includes an extraction/transform/load layer 107 in which the unstructured data 210 is structured and then written into a structured analysis schema 108. Web service 109 and structured analysis connectors 110 provide structured data tools 230 access to the data in the analysis schema 108.

Figure 3:
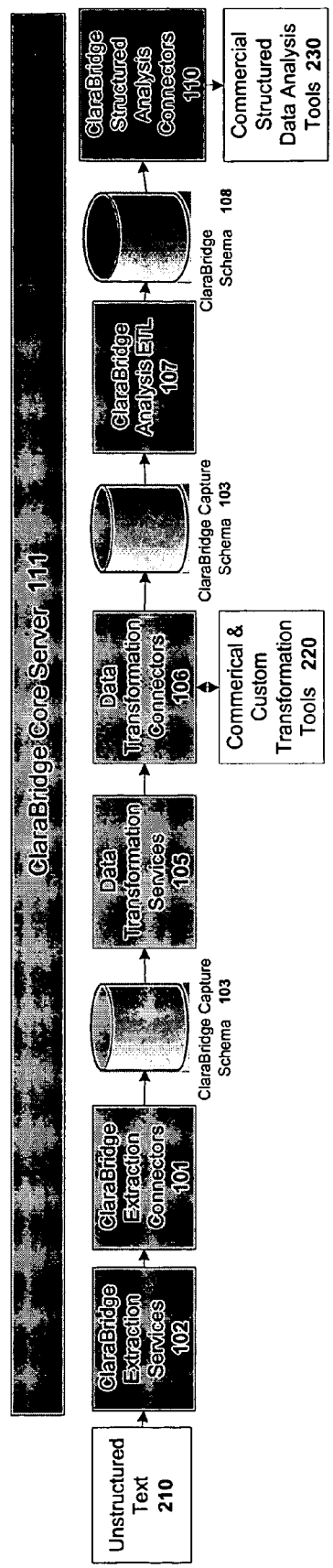
FIG. 3 is a flow diagram of an embodiment of the process steps based upon the system of FIG. 2.

This embodiment will now be described with reference to the flow diagram illustrated in FIG. 3. In the method of the illustrated embodiment, unstructured data 210 is accessed by the extraction services 102 through the extraction connectors 101. The extraction connectors 101 parse the unstructured data 210 while also associating the source document with the unstructured data. The parsed unstructured data is sent to the capture schema 103 and then preferably sent to one or more commercial, open source, or custom developed transformation components 220 capable of extracting individual pieces of data from unstructured text, determining the topic of a section, extracting a section of text from a whole document, matching names and addresses, and other text and data processing activities. The unstructured data 210 is sent to the one or more commercial, open source, or custom-developed transformation components 220 via the transformation service 105 and the transformation connectors 106. The extracted data may then be added to data already present in the capture schema 103. The data in the capture schema 103 may then be processed by the extraction/transform/load layer 107. The extraction/transform/load layer 107 structures the data and then stores it in the analysis schema 108. Data from the analysis schema 108 may then be passed through the structured analysis connectors 110 to one or more commercial structured data analysis tools 230. The core server 111 manages and coordinates this entire data flow process and marshals the data and associated and generated metadata all the way from the various sources of data all the way through the various transformation components 220 to the schemas 103, 108 and to the analysis tools 230.

The middleware software system 100 of the present embodiment enables structured data analysis tools 230 to analyze unstructured data 210 along with structured data. It is composed of several software modules, each of which includes features that distinguish the middleware software system 100 from existing software tools used for analyzing unstructured data 210.

The extraction services 102, for example, use a single application program interface (API) that interfaces with the various sources of unstructured data. The API can be used to access and extract document text and metadata, such as author, date, size, about the documents. Typically, each source of unstructured data 210 has its own API. Prior art tools that interfaced with multiple sources of unstructured data 210 commonly had a corresponding API for each source of data. In contrast, the single API of the extraction services 102 of the present invention can interface with numerous sources of unstructured data including (i) file servers; (ii) web servers; (ii) enterprise, content, management, and intranet portals; (iii) enterprise search tool repositories; (iv) knowledge management systems; and (v) Documentum™. Additionally, the single API of the extraction services 102 can interface with scanned and OCRed (optical character recognition) paper files. Preferably, the single API can interface with all of the internal modules of the middleware software system 100 as well as the various structured data analysis tools 230. This allows the sources to be treated as a "black box" by the rest of the middleware software system 100 components.

The extraction connectors 101 process text, data, and metadata that are returned from the unstructured source systems 230 as a result of the requests from the extraction services 102. Additionally, the extraction connectors 101 load the results into the capture schema 103. The extraction connectors 101 convert the various outputs from the various unstructured source systems into a consistent schema and format for loading into the capture schema 103. Preferably, the extraction connectors 101 also process the various pieces of metadata that are extracted from the source systems into a common metadata format. Further, a unique index key is assigned to each extracted source document 210, which allows it to be consistently tracked as it moves through the rest of the middleware software system 100. This key, and the associated metadata stored regarding the source location of the text, also provides the ability to link back to the original text when desired during the course of analysis. No currently available software can take unstructured data 210 from a variety of sources and put them into a consistent schema, nor process various pieces of metadata that are extracted from multiple source systems into a common metadata format.

The transformation services 105 manage the process of taking the collected unstructured data 210 and passing it through one or more custom, open source, or commercial transformation components 220. The transformation components 220 provide a variety of value-added data transformation, data extraction, and data matching activities. The results of one or more transformations may serve as an input to downstream transformations. Further, the transformation services 105 may be run by the core server 104 in a coordinated workflow process. Similar to the extraction services 102, the transformation services 105 provide a common API to a wide variety of custom, open source, and commercial unstructured data transformation technologies, while serving a as "black box" abstraction to the rest of the middleware software system 100.

The transformation connectors 106 process the output of the various transformation components 220 and convert the output into a consistent format that then may be loaded into the capture schema 103. It maps the widely variant output from a wide variety of unstructured and structures data transformation components 220 into a common consistent format, while preferably also retaining complete metadata and links back to the original source data. This allows tracability from the end user's analysis back through the transformations that took place and from there back to the original source of the unstructured data 210.

The transformation connectors 106 are preferably engineered to understand the format of data that is provided by the supported data transformation tools 220. For example, a connector for the GATE text processing system may be provided. The transformation connectors 106 may be designed to take as input the specific XML structure that is output by the GATE tool. The connector then uses coded logic and XSL transforms to covert this specific XML from, in this example, the GATE tool into a consistent transformation XML format. This format represents an XML data layout that closely maps to the data format of the capture schema 103. The transformation connectors 106 then load the consistent transformation XML into the capture schema 103 using standard data loading procedures.

The middleware software system 100 also includes a section and header extractor (not shown). This is a custom transformation tool 220 that takes for an input a text document and a set of extraction rules and instructions. Preferably, the section and header extractor outputs any and all document headers, as well as a specific section or sections from the document as described by the input rules. Unlike prior art tools for analyzing unstructured data 210, the section and header extractor provides a rules-based approach to locate and extract document headers as well as sections from unstructured texts that may or may not provide any internal section headings, tags, or other indications as to where one section ends and another begins.

The header extractor can look for specific document headers and extract the data of the headers. Further, it stores the header data in the capture schema 103. As an example, SEC filings include headers such as "filed as of date", "effectiveness date", "central index key", and "SIC code." These headers can be extracted by the header extractor and put in the capture schema 103.

The section extractor can extract a specific section or a series of specific sections from a document based on a sophisticated set of rules. These rules may include:
1. Preprocessing, including optional removal of HTML or other tags and special character, and other specific character conversions (example, convert "AAA" to "BBB" throughout document before further extraction processing). Also include specific removals, for example remove strings matching "CCC" or between "DDD" and "EEE" from all parts of the document before further processing.
2. Section Start Rules: Match document text to a set of provided character strings, with the following optional parameters:
   a. Search from the top of the document down, or from the bottom of the document up
   b. Search for the first match of any string of the set, or first search the whole document for the first string in the set, and if not found move to the next string
   c. Search in a case-sensitive manner or case-insensitive manner
   d. Rules regarding what to do if start string not found (for example, skip document, extract no section, or treat whole document as if it was the desired section)
3. Section End Rules: essentially the same as the Section Start rules, with the additional parameters of:
   a. Search from the section start point, or from the start of the document, or from the end of the document
   b. Search up or down from the start point
   c. Optional parameter to stop section extraction after a certain number of characters, and direction to go from start point before stopping (up or down).
   d. Rules regarding what to do if end point is not found (for example, skip document, extract no section, save rest of document starting at the start point, or extract a certain number of characters from the start point).

The middleware software system 100 also includes a proximity transformer (not shown). This is a custom transformation tool 220 that further transforms the results of other transformation tools 220. This transformation tool 220 looks for events, entities, or relationships that are closest and/or within a certain distance (based on number of words, sentences, sections, paragraphs, or character positions) from other entities, events, or relationships. Typically, it is configured to look for specific types of things that are close to other specific types of things. For example, it can be used to look for the closest person name and dollar amount to a phrase describing the issuance of a loan. Unlike prior art tools for analyzing unstructured data 210, the proximity transformer can associate data elements together based on input rules, types of elements, and their proximity to one another in unstructured text.

In particular, the proximity transformer may be configured to look for a certain types of entity or relationship (based on entries in the entity and relationship hierarchy) entries in the analysis schema 108. Preferably, for each matching entity or relationship that is found, it then looks for the closest (by character position, number of words, number of sentences, number of paragraphs, or number of sections) instance of a second (and optionally third, fourth, etc.) specific type of entity. If the proper collection of relationship and entity types are located with a certain optional distance limit (preferably, based on character positions or other criteria listed above), and optionally within a certain direction from the first entity or relationship (up or down), then a new relationship is added to the analysis schema 108 to indicate the newly located relationship. The relationship is associated with its related entities and the roles that these entities play.

For example, the proximity transformer can be used to locate instances of loans described in the source documents, and to locate the borrower, lender, dates, and dollar amount of loans. In this example, the proximity transformed could first look for entries in an entity table in the analysis schema 108 that are related to the hierarchy element "loan". Then the transformer could search for the closest company entity and assign that company as the lender. Then it could locate the nearest person, and assign that person as the borrower. It could than locate the nearest entity of hierarchy type "financial→currency" and assign that to be the amount of the loan. Preferably, a new relationship would be entered into the relationship table to represent this loan and its associated related entities and the role that they play. Additionally, more sophisticated rule sets can be used in conjunction with proximity analysis in order to increase the quality of found relationships and assigned entity roles.

The middleware software system 100 also includes a table parser (not shown). The table parser is a custom transformation tool 220 that takes as an input a table of data (which may have been extracted from a document by using the section extractor) represented in textual form (either with markup tags such as HTML or in plain-text) and extracts the column headers, row headers, data points, and data multiplers (such as "numbers in thousands") from the table. Unlike prior art tools for analyzing unstructured data 210, the table parser can preferably take any type of text table that is readable by a human and can convert the table into a structured rows, columns, cells, headers, and multiplier representation that can then be used for further structured analysis. Each input text table can vary from the next, and the table parser can extract data without being specifically pre-configured for each possible input table format. The table parser can adapt dynamically to any table format and any combination of columns and rows. It operates using algorithms designed to analyze a table as a human would visually, for example by distinguishing columns based on their placement to one another and the "whitespace" between them.

The detection of a table in document can be performed with section extractor, described above. Properly configured, the section extractor is capable of finding and segregating tables from surrounding text.

Once the table is extracted from the text, it then may be parsed by the table parser. Preferably, the first part of the algorithm breaks up the table into rows and columns and represents the table in a 2-dimension array. For tables represented in a markup language such as HTML, this may be done by analyzing the markup tags that delineate the table into rows and columns. Processing is then done to combine table cells that are marked as separate but only for visual formatting purposes.

For tables represented in plain-text without markup tags that are displayed in a fixed-width font such Courier, an algorithm is used that mimics how a human would visually identify columns based on the percentage of vertical white space in any vertical column. Columns that contain a large percentage of white space are identified as separating the table columns. Based on the column analysis, rows and columns are extracted and represented in a 2-dimensional array.

The 2-dimensional array, created either from a table with HTML or other markup, or from a plain-text table, may then be processed further to identify column headers, numerical order of magnitude indicators, and row headers. Column headers can be identified based on their position on top of columns that mainly contain numerical values. Order of magnitude indicators can be extracted from the top portion of the table and generally are worded as "numbers in thousands", or "numbers in millions". These conversion factors are then applied to the onward processing of the table. Preferably, row headers are located by looking for table rows that have a label on the left-side of the table but do not have corresponding numerical values, or that have summary values in the columns. Row headers can be differentiated from multi-line row labels by analyzing the indentation of the potential header and the row(s) below. The result of this processing is a data array containing row labels, corresponding headers, column headers, and corresponding numerical values.

This data, once extracted from a table, may then be stored in the capture schema 103 in a normalized data table that is capable of storing data extracted from any arbitrary table format. That data may then be loaded into the analysis schema 108 and can be analyzed along with any other structured and unstructured 210 data.

Capture schema 103 is preferably a database schema. That is, having a pre-designed layout of data tables and the relationship between the tables. Preferably, the capture schema 103 is specially designed to serve as a repository for data captured by the extraction connectors 101 and also to hold the results of the transformation connectors 106. Capture schema 103 is designed in an application-independent manner so that it can preferably hold any type of source unstructured data 210, extracted headers and sections, and the results of transformation components 220. It also can preferably hold entities and relationships, as well as any data extracted from text tables within unstructured texts. The capture schema 103 can suit the needs of any type of unstructured data capture and transformation tool 220 without being custom-designed for each application.

Additionally, the capture schema 103 is designed to capture and record the output from various types of text transformation tools 220, such as entity extraction, relationship extraction, categorization, and data matching tools. The capture schema 103 preferably has a general-purpose structure to accommodate the various outputs from a variety of type of text analysis tools from a variety of vendors, open source communities, or from custom application development projects.

The tables in the capture schema 103 include a table to store information about extracted entities, such as people, places, companies, dates, times, dollar amounts, etc. The entities are also associated with attributes, such as their language of origin or temporal qualities. Further, the capture schema 103 contains data relating to entity occurrences, which are the actual locations of the entities as found in the source documents. There may be multiple occurrences of the same entity in a single document. The capture schema 103 retains information about entities, entity occurrences, and the relationships between these items, as well as the associated attributes that may be associated with entities and entity occurrences.

The capture schema 103 also contains information on relationships. Relationships are associations between entities, or events that involve entities. Similar to entities, relationships also have associated relationship attributes and occurrences that are all captured by the capture schema 103. Additionally, the capture schema 103 contains a mapping table between relationships and the related entities, master entities, and entity occurrences, including information on the role that the related entities play in the association or event.

The capture schema 103 also contains information about documents in the middleware software system 100, and the relationships between the documents to the entities and relationships that are contained within them. Documents may have associated attributes (such as source, author, date, time, language, etc.), and may be grouped together in folders and be grouped by the source of the document. The documents are all assigned a unique key which can be used to identify the document and data derived from the document throughout the entire system and can be used to reference back to the original document in the original source. The binary and character text of the document can also be stored in the capture schema 103 as a CLOB and/or BLOB object. Sections of the document, if extracted by the section extractor, are also stored in the capture schema 103 and related to the documents that they were extracted from.

Information from categorization tools may also be included in the capture schema 103. Such data elements include topics and categories of documents and sections of documents. This data is linked to the other data such as entities and relationships through a series of cross-reference tables.

The capture schema is designed to consolidate the output from a variety of data analysis technologies in a central repository while retaining a consistent key to allow for cross-analysis and linking of results for further analysis. The consistent key also allows for drill-down from analytical reports back to source documents and to the details of the transformations that led to each data element being present in the schema.

For example, from a report that shows the average number of loans to executives disclosed in a company's SEC filings for an entire industry, an analyst could drill down to the number of loans for each company in the industry, then to the individual loans disclosed in each filing, then to the details of a particular loan event, then drill all the way down to the text in the filing that disclosed the loan. The textual source of the event is generally shown to the user within the context of the original source document, with the appropriate sentence(s) or section(s) highlighted.

This drill-down is enabled by several unique features of the system. The hierarchies present in the analysis schema, discussed in more detail below, can be traversed step-by-step along a variety of dimensions present in the schema to drill down to the precise set of information desired. From there, the details of the underlying relationships, events, or entities can be displayed from the user as they are also present in the analysis schema.

From there, when an analyst desired to view the underlying source material, the source document is retrieved either from the capture or analysis schema, if stored there, or from the original source location via a URL or other type of pointer. The relevant section, sentence, phrase, or word(s) can then be highlighted based on the starting and ending positions stored in the analysis schema that represent the location(s) that the relevant entities or relationships were extracted from originally.

Figure 4:
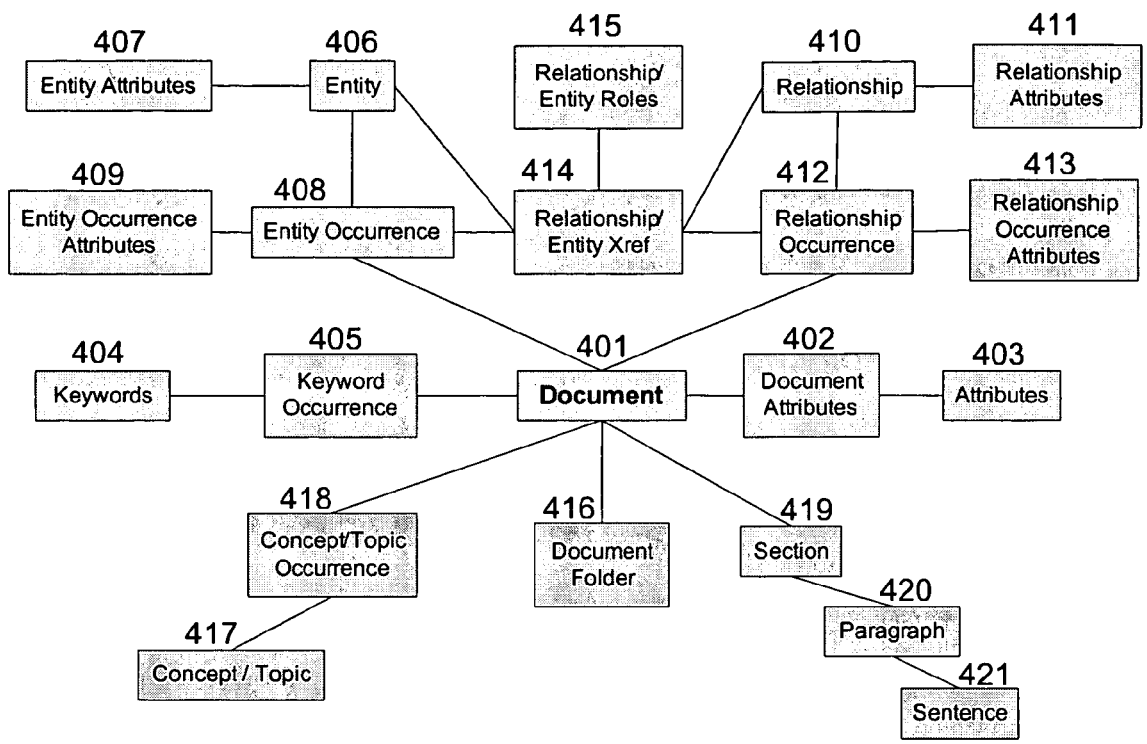
FIG. 4 is a schematic diagram of a capture schema of an embodiment of the invention.

FIG. 4 is a schematic illustration of the capture schema 103. Each of the boxes in the schematic diagram represents a component of the capture schema 103. These content and function of these components is as follows.

Document 401: This is a data table that preferably contains details on each document, including the document title, URL or other link back to the source, the source text itself (optionally stored), the document size, language, initial processing characteristics, link to the folder or other logical corpus grouping containing the document, and a unique document key that is consistently used to refer to the document throughout the system. The term "document" in this system represents any distinct piece of text, which may or may not resemble a traditional paper document. For example a memo field value extracted from a CRM system would also be referred to as a distinct document by the system. Given this abstraction, a document could be very small or very large or somewhere in between.

Document Attributes 402: Preferably contains a mapping of each document to the extended properties or attributes of the document. Examples of document attributes include, but are not limited to, headers extracted from documents and their corresponding values, or other metadata that is extracted along with the document such as author(s), title, subtitle, copyright, publishers, etc.

Attributes 403: Preferably, contains a master lookup table of the types of attributes stored in the system, so that attributes representing the same type of data can be represented by the same attribute ID to allow for consistent analysis and loading of attribute data.

Keywords 404: Preferably contains a master lookup table of all keywords in all documents. A consistent key is assigned to each unique keyword to allow for consistent data loading and for cross-analysis of keywords across documents, sections of documents, and collections of documents.

Keyword Occurrence 405: Preferably, contains a mapping to the occurrences of keywords to the documents that contain the keywords. Preferably, it includes one entry for each keyword occurrence in each document. It also preferably includes the start and end position (represented by character count from start of document) of the occurrence of the keyword. Preferably, it also includes information relating to the extraction process that found the keyword occurrence.

Entity 406: Preferably contains one entry for each unique entity that is mentioned in each document. An entity generally represents a noun phrase that represents a physical or abstract object or concept. Entities are generally found as nouns in sentences. Example of entities include but are not limited to people, companies, buildings, cities, countries, physical objects, contracts, agreements, dates, times, various types of numbers including currency values, and other concepts.

Entity Attributes 407: Preferably contains attributes related to each entity. Attributes may be any arbitrary piece of metadata or other information that is related to an entity, and may include metadata from an entity extraction tool such as the confidence level associated with the extraction of the entity from a piece of text. Entity attributes may also include grouping or ontological information that is useful in the later creation of entity hierarchies during the creation of the analysis schema.

Entity Occurrence 408: Preferably contains one entry for each time an entity is mentioned in a document. It may also include the start and end position of the entity occurrence, as well as details of the extraction process that found the occurrence.

Entity Occurrence Attributes 409: Preferably contains arbitrary additional metadata relating to the entity occurrence. These attributes are typically similar and in some cases may be the same as the information in the Entity Attributes table, but may also contain attributes that are unique to a particular occurrence of an entity.

Relationship 410: Preferably contains details on relationships extracted from documents. A relationship represents a link between entities or an event involving entities. An example of a relationship would be "works-for," in which an entity of type person is found to work for an entity of type company, in a certain capacity such as "President." This data structure represents unique relationships on a per-document basis.

Relationship Attributes 411: Preferably contains additional details of the extracted relationships, such as the confidence level of the extracted relationship, ontological attributes of the relationship, or other attributes at the relationship level.

Relationship Occurrence 412: Preferably contains information on each occurrence of text that references a certain relationship. For example, if a certain "works-for" relationship if referenced several times in a certain document, this table would contain one entry for each time the relationship is referenced. This table also may contain information on the exact start and end character position of where the relationship instance was found in the document.

Relationship Occurrence Attributes 413: Preferably contains details of attribute at the relationship occurrence level. May contain similar information to the Relationship Attributes table.

Relationship/Entity Xref 414: Preferably contains a cross-reference table that links the entities to the relationships that involve them. Preferably, this table exists both at the relationship and the relationship occurrence levels. It also may provide a link to the role that each entity plays in a certain relationship.

Relationship/Entity Roles 415: Preferably contains a master index of the various types of roles that are played by entities in various relationships. By providing for a master relationship role key, this allows relationship roles and the entities that play those roles to be matched across various documents and across collections of documents.

Document Folder 416: Preferably groups documents into folders. Folders are abstract concepts that can group documents and other folders together, and may or may not represent a folder structure that was present in the original source of the documents.

Concept/Topic 417: Preferably contains concepts or topics referred to in documents or assigned to documents by concept and topic detection tools. May also contain topics and concepts at the section, paragraph, or sentence level if concept and topic detection is performed at the lower sub-document level.

Concept/Topic Occurrence 418: Preferably contains details of exactly where certain topics or concepts were detected within a document or sub-component of a document. It may also include start and end position within the text of the concept or topic occurrence.

Section 419: Preferably contains details on sections of documents. Sections may be designated in the extracted source document, or may be derived by the system's section extractor. Preferably, this table stores details on the sections, including the start and end position, and optionally stores the section text itself.

Paragraph 420: Preferably contains details on paragraphs within a document or within a section of a document. It preferably contains start and end position, and optionally contains the text of the paragraph itself.

Sentence 421: Preferably contains details on sentences within a document or within a section of a document. Preferably, it also contains start and end position, and optionally contains the text of the sentence itself.

The analysis schema 108 is similar to the capture schema 103, except it is preferably designed to allow for analysis by commercially available structured data analysis tools 230 such as business intelligence, data mining, link analysis, mapping, visualization, reporting, and statistical tools. The analysis schema 108 provides a data schema that can be used to perform a wide range of differing types of analysis for a wide variety of applications based on data extracted from unstructured text without needing to be custom-designed for each analytical application, analysis tool, or each type of input data or applied transformation.

The data in the analysis schema 108 resembles the data in the capture schema 103, however it extends and transforms the data in several ways in order to structure and prepare the data for access and analysis by structured data analysis tools 230. In the analysis schema 108, the entities are preferably also grouped into master entities. The master entities group entities that appear in multiple documents that are the same in the real world. Also, master entities group together entities that may be spelled differently or have multiple names in various documents or sources into one master entity since they represent the same actually entity in the real world. For example, the terrorist group Hamas and the Islamic Resistance Movement may be grouped together as they represent the same actual group.

The analysis schema 108 can also group entities that are associated with a hierarchy. For example "George W. Bush" might be associated with the person→government→USA→federal→executive node of a hierarchy. Similar to entities, relationships also have associated hierarchies that also may reside in the analysis schema 108.

In the analysis schema 108, entities that represent dates and numeric amounts may be processed so that the date and/or numeric data is stored separately in specific table columns in the appropriate data types. Typically, this processing requires analysis of the text description of the entity and the extraction and processing of the text into standard date and numeric values.

Additionally, the analysis schema 108 also has the capability to be extended in order to include existing or other structured data, so that it can be cleanly tied to the rest of the data and analyzed together in one consistent schema.

Figure 5:
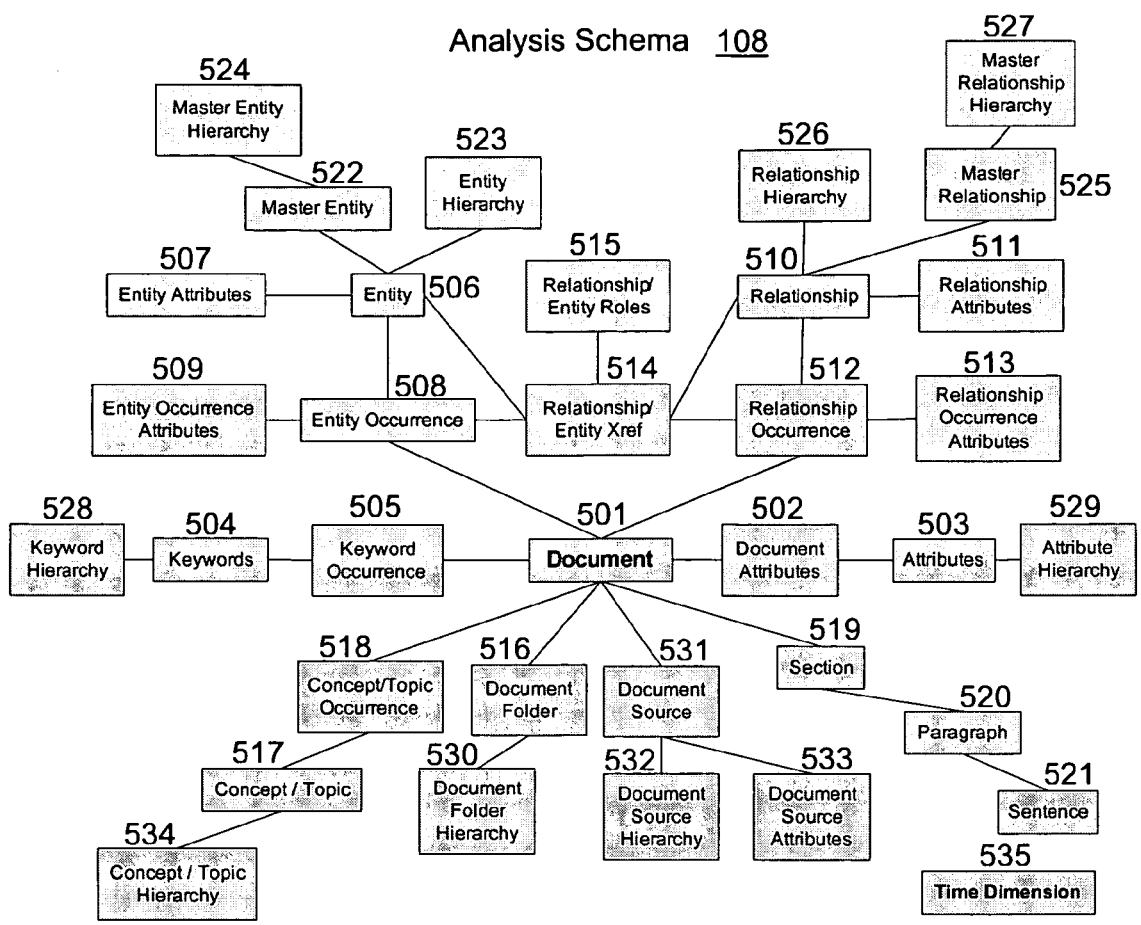
FIG. 5 is a schematic diagram of an analysis schema of an embodiment of the invention.

FIG. 5 is a schematic illustration of the analysis schema 108. Each of the boxes in the schematic diagram represents a component of the analysis schema 108. These content and function of these components is as follows.

The boxes labeled 501 through 521 correspond to boxes 401 through 421 of the capture schema 103, having substantially similar structure and performing substantially similar functions.

Master Entity 522: Preferably contains a unified ID that represents an entity that appears across multiple documents, and links to the underlying entities and entities that occur within individual documents. For example, a master entity of "United States of America" would refer to the country of the same name. The master entity would consolidate all mentions of the country in all documents, including mentions that use alternative expressions of the country's name such as "United States", "USA", "U.S. of A", etc. This consolidated master entity allows this entity to be analyzed across documents as a single entity. The actual consolidation is preferably performed during the analytical ETL process using matching algorithms or through the use of external data matching technologies via a transformation connector 106.

Entity Hierarchy 523: Preferably, places entities into a hierarchy based on an ontology of how entities relate to other entities and how they can be grouped together. For example, a hierarchy may group normal people into a "thing→physical→animate→person→civilian" node of a hierarchy. By associating entities into hierarchies, the hierarchies can be used to group entities together into buckets that can then be used for analysis at various levels.

Master Entity Hierarchy 524: preferably, identical to the entity hierarchy, except at the master entity level. Both hierarchies are useful, as some types of analysis are best performed at the master entity level, and others at the entity level.

Master Relationship 525: Preferably, similar to master entity, except groups relationships into common relationships that are expressed across a group of documents. For example, the fact that George Washington was a former president of the United States may be a relationship that is disclosed in a variety of documents across a document collection. The master relationship would establish this relationship, and would then link to the sub-relationships that are expressed in individual documents.

Relationship Hierarchy 526: Preferably, similar to the entity hierarchy, except representing relationships and events. For example, a car bombing event may be categorized into a hierarchy known as "event-physical-violent-attack-bombing-car_bombing." The analysis of various types of relationships and events across a hierarchy can provide interesting insights into what types of events are discussed in a set of documents, or are taking place in the world.

Master Relationship Hierarchy 527: Preferably, similar to the Relationship Hierarchy, except involving Master Relationships. These are useful as in some cases it is useful to analyze distinct relationships or events that may be referenced in multiple sources, and in other cases it may be interesting to analyze each individual reference to an event or the frequency of mentions of one event versus another.

Keyword Hierarchy 528: Preferably, groups keywords into hierarchies. These hierarchies can then be used to group data together for analysis.

Attribute Hierarchy 529: Preferably groups attributes together into hierarchies. These hierarchies can then be used to group documents together based on their various attributes for analysis, or to select certain types of documents for inclusion or exclusion from certain analyses.

Document Folder Hierarchy 530: Preferably, groups folders of documents into higher level folders in a recursive manner allowing for unlimited numbers of folder levels. These folders can be used to separate collections documents into distinct buckets that can be analyzed separately or in combination as required by the analytical application.

Document Source 531: Preferably contains a cross-reference between each document and the source of the document. The source may be a certain operational or document management system, or may represent a news organization or other type of external content source.

Document Source Hierarchy 532: Preferably, groups document sources into categories. For example internal documents may be represented by an internal document hierarchy, and documents acquired from a news feed may be in a separate hierarchy based on type of news source and/or the geographic location of the source of the document.

Document Source Attributes 533: Preferably, contains any additional attributes relevant to the source of the document. Such attributes may be trustworthiness of the source, any political connections of the source, location of the source, or other arbitrary data points relating to the source of the documents.

Concept/Topic Hierarchy 534: Preferably, contains a hierarchy of concepts/topics. As with entities and relationships, concepts and topics are often interested to analyze within the context of a hierarchy. For example documents pertaining to international finance may need to be grouped and analyzed separately from those pertaining to intellectual property protection.

Time Dimension 535: Preferably, represents a standard relational time dimension as would be found in a traditional data warehouse. This dimension, for example, contains years, months, weeks, quarters, days, day of week, etc. and allows the rest of the data that is stored as date values to be analyzed and grouped by higher level date and time attributes, and also allows for calculations such as grow rather week over week or year over year. This also allows for period-to-date and this period vs. last period calculations such as those used in time series and growth rate analysis.

Entity (extensions) 506: Preferably, the analysis schema also extends the entity table to represent numerical, currency, or date-based entities in the appropriate data forms for analysis by analytical tools. For example, any entities representing currency would be converted to a currency data type in the underlying database or data storage repository.

The extraction/transform/load (ETL) layer 107 provides a mapping and loading routine to migrate data from the capture schema 103 to the analysis schema 108. The extraction/transform/load layer 107 is unique due to the uniqueness of the two general-purpose application-independent schemas that it moves data between. Further, the routines that make up the extraction/transform/load layer 107 operate in an application-independent manner.

The ETL process can preferably contain the following steps:
  Master entity determination and assignment: Matching entities to corresponding master entities. Often involves matching disparate spellings to the corresponding master entities.
  Master relationship determination and assignment: Grouping of relationships together that represent the same relationships or events into a single master relationship.
  Entity Hierarchy & Master Entity Hierarchy creation: creation and/or maintenance of entities into their corresponding hierarchical groupings. Similar process for master entities.
  Relationship Hierarchy & Master Relationship Hierarchy: creation and/or maintenance of relationships into their corresponding hierarchical groupings. Similar process for master relationships.
  Keyword Hierarchy: creation and/or maintenance of the keyword hierarchy.
  Attribute Hierarchy: creation and/or maintenance of the attribute hierarchy.
  Concept/Topic Hierarchy: creation and/or maintenance of the concept/topic hierarchy.
  Document Folder: creation and/or maintenance of the document folder hierarchy.
  Document Source: extraction of document source information from document attributes into its own data structure.
  Document Source Attributes: extraction of attributes relating to document sources into a separate data structure
  Document Source Hierarchy: creation and/or maintenance of the document source hierarchy.
  Time Dimension: creation of the standard system time dimension for time-series analysis.
  Entity Extensions: identification of date and numeric types of entities and conversion of date and numeric values into corresponding native data types where appropriate.
  Data de-duplication: identification and (optional) removal of duplicate source documents to avoid double-counting.

The core server 104 coordinates the execution of the various components of the middleware software system 100 and the movement of data between the components. It is designed in a multi-threaded, grid-friendly distributed manner to allow for the parallel processing of extremely large amounts of data through the system on a continuous real-time high-throughput basis. It is the only data processing server designed to perform these types of data movements and transformation based on unstructured data sources.

The features of the core server 104 can include:
  The ability to configure unstructured source extractors and treat them as black boxes in the data workflows
  The ability to extract unstructured data 210 from multiple disparate sources and source systems and use the extracted information as input for further processing
  The ability to automatically route the unstructured data 210 through a series of unstructured transformation tools 220, both custom-designed and off-the-shelf
  The ability to configure a end-to-end data flow from sources through one or more transformation tools 220, into a capture schema 103 and then into an analysis schema 108 for analysis by structured analysis tools 230
  The ability to retain a single key for each source document as it moves through the middleware software system 100 and as value-added information output from transformation tools 220 is added to the capture schema 103
  The storage of all extracted unstructured data 210 as well as all metadata and value-added extracted transformation results into a single capture schema 103
  The ability to use a drag & drop data flow editor to design, edit, execute, and monitor unstructured data 210 flows through transformation tools 220 and into an analysis schema 108

The provider web service 109 provides a gateway for structured analysis tools 230 to access and analyze the data contained in the analysis schema 230. It is designed so that structured analysis tools 230 can access the analysis schema 108 using a standard web services approach. In this manner, the structured analysis tools 230 can use a web services interface to analyze the results of transformations applied to unstructured data 210 and can join this data to other existing structured data that may, for example, reside in a data warehouse. By allowing the analysis of structured data and unstructured data 210 together, new insights and findings can be found that would not be possible from structured data alone.

The structured connectors 110 allow structured data analysis tools 230 to analyze the data present in the analysis schema 108. While this may sometimes be performed through common interfaces such as ODBC or JDBC, the structured connectors 110 preferably also include the capability to pre-populate the metadata of the structured analysis tool 230 with tables, columns, attributes, facts, and metrics helpful to immediately begin analyzing the data present in the analysis schema 108 without performing tool customization or any application-specific setup. Preferably, the structured connectors 110 also provide the ability to drill-through to the original unstructured source document, and also provide the ability to view the path that the data took through the system and the transformations that were applied to any piece of data. Preferably, this allows the ability for an analyst to completely understand the genesis of any result that they see in the structured analysis tool 230, to know exactly where the data came from and how it was calculated, and to be able to drill all the way back to the original document or documents to confirm and validate any element of the resulting structured analysis.

Typically, metadata can be pre-populated for supported structured analysis tools 230. Preferably, middleware software system 100 includes a pre-configured project for each analysis tool to understand the tables, columns, and joins that are present in the analysis schema 108. Further, the tables, columns, and joins may be mapped to the business attributes, dimensions, facts, and measures that they represent. Preferably, analytical objects such as reports, graphs, and dashboards are also pre-built to allow out-of-the box analysis of data in supported structured analysis tools 230.

Drill-through to the underlying unstructured source data 210 is preferably accomplished through embedded hyperlinks that point to an additional component, the source highlighter. Preferably, the hyperlinks include the document ID, entity ID, or relationship ID from the analysis schema 108. The source highlighter can accesses the capture schema 103 and retrieve the document or section of document where the selected entity or relationship was found. Also the start and end character position may be loaded from the capture schema 103. If so, the source highlighter may display the document or section to the user, automatically scrolls down to the location of the relevant sentence, and highlight it for easy reference by the user.

The Middleware software system 100 also includes a confidence analysis component (not shown). The confidence analysis capability allows users to not only see and analyze data within structured analysis tools 230, but to also calculate a numeric confidence level for each data element or aggregate data calculation. Since unstructured data 210 is often imprecise, the ability to understand the confidence level of any finding is very useful. The confidence analysis capability joins together many data points that are captured throughout the flow of data through the middleware software system 100 to create a weighted statistically-oriented calculation of the confidence that can be assigned to any point of data. Preferably, this combines the results of various data sources and applied transformations into a single confidence score for each system data point, to provide for a quality level context while analyzing data generated by the middleware software system 100.

The algorithm used to calculate confidence can take into account the following factors when calculating a weighted confidence score for any data element in the middleware software system 100:

- Confidence score of value provided (if any) by transformation tools 220 used in the data flow to generate the relevant data point
- The number of relationships found in the source document compared to the size of the source document, compared to the average number of relationships found per kilobyte or other size measure of a document. This metric can also be calculated based on the average number of relationships per kilobyte for relationships of the same type as the selected relationship.
- The number of entities found to be associated with the relationship, compared to the average number of entities for relationships in the same hierarchy
- The number of times similar relationships have been found in the past
- The number of entities that are grouped together to form a master entity
- The number of times the entity occurred in the document compared to the average number of occurrences for entities in the same hierarchy, optionally weighted by document size
- Weighted confidences based on hierarchy of relationship or entity. Some hierarchies may be more highly trusted than others and assigned a higher confidence.
- Other commercially available measures of data extraction confidence that can be integrated with the system via the analysis schema 108 and included in confidence calculations.
- Measures based on the "fullness" of a relationship's attributes. For example a loan transaction event where detail involving loan size, payment terms, interest rate, lender, and borrower was all extracted would have a higher confidence score than a loan relationship that only identified the lender without the other attribute factors.
- Measures based on the confluence of the same finding by multiple transformation tools. For example if two different entity extraction tools find the same entity in the same place, this would instill higher confidence in data and calculations involving the entity.
- Measures based on the source of the document. Some sources or authors may be weighted as higher confidence based on various factors.
- Weighted combinations of two or more of the above metrics and/or various other metrics.

Further, the confidence scores calculated based on factors such as those above can be assigned to individual data rows and data points of analysis results and displayed together with the resulting analysis.

The middleware software system 100 also includes an enhanced search component (not shown). While analysis of the data in the middleware software system's 100 capture schema 103 can provide for interesting insights, and represents a paradigm shift from traditional searching of unstructured information, the middleware software system 100 also provides data and metadata that can be used to improve existing or to drive new search capabilities.

Most searches of unstructured data are based on keywords or concepts described in individual source documents, and most searches result in a list of documents that meet the search criteria, often ordered by relevancy.

Middleware software system 100 allows those search results to be extended by the inclusion of additional items in the traditional search indexing process. These techniques include:

- Indexing the data in the analysis schema. This can be done by creating "data dump" reports using a reporting tool that create a list of each entity, topic, or relationship discussed in a document along with a link back to the source document. This report can then be run periodically automatically and included in the indexing routine of a standard search engine. The search engine can also be optionally enhanced to understand the format of this report and to rate, rank, and provide the results accordingly.
- Analytical reports can be automatically periodically run and included in the indexing process of a search engine. This allows a search engine to provide links to analytical reports interspersed within standard links back to source documents. By indexing the reports headers, title, and comments, as well as the actual data that is contained in the report results, specialized search results can be achieved. For example, a search for "hamas growth rate" could provide a link back to a report that includes a metric called "growth rate" and a data item called "Hamas."
- Search engines can be enhanced to index and understand the metadata contained in the definition of the dimensional model of the analytical data mart schema, the definitions of the facts, metrics, and measures, and also take into account the data contained within the dimensions and measures, and to provide results accordingly. For example, if a data mart contains a dimension such as "country", a dimension called "year", and a metric called "population", a search engine would be able to construct a report on the fly to answer a question such as "population USA 2004", without having previously indexed either a source document or a report result dataset containing this information.

The following is an example query that can be run using the system and method of the invention. In this example, the user wants to know which companies have had transactions with their own corporate officers that require reporting under SEC rules. This requires the processing and analysis of approximately 40,000 pages of SEC filings for each quarter-year's worth of filings. These filings are plain text, that is, unstructured data. Unfortunately for the user, there is no required uniform method of reporting the desired transactions to the SEC and thus, they may be found under sections with various headings and may be worded in various ways. Using the middleware software system 100 of the present invention, the filings are run through a transformation program 220 that is instructed to associate the corporate officers to particular types of transactions (e.g., loans, leases, purchases & sales, and employment-related). The associated data is then stored in data structures that can be analyzed with a business intelligence tool.

Figure 6:
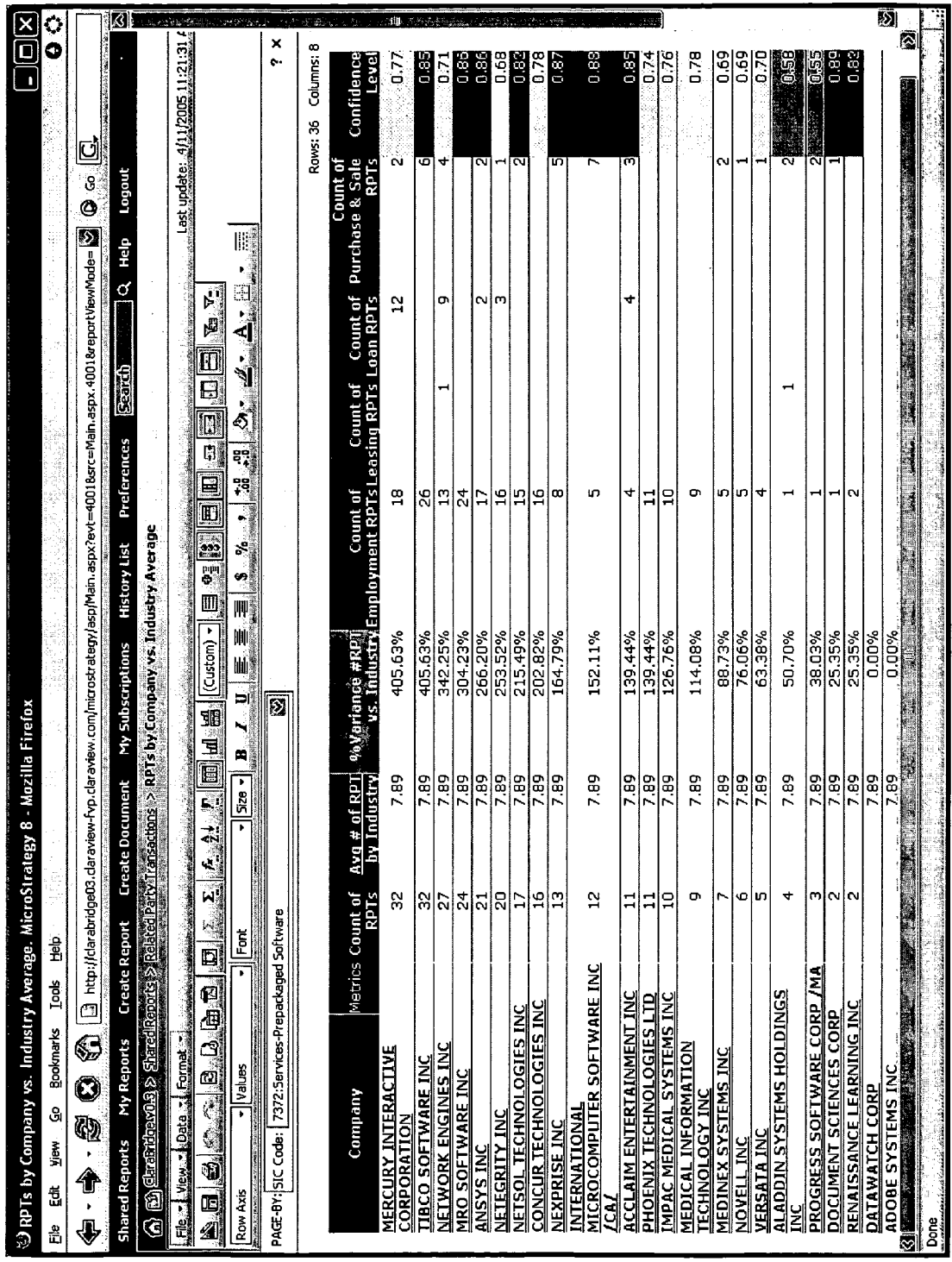
FIG. 6 is a screen capture of a report generated by an embodiment of the invention.
Figure 8:
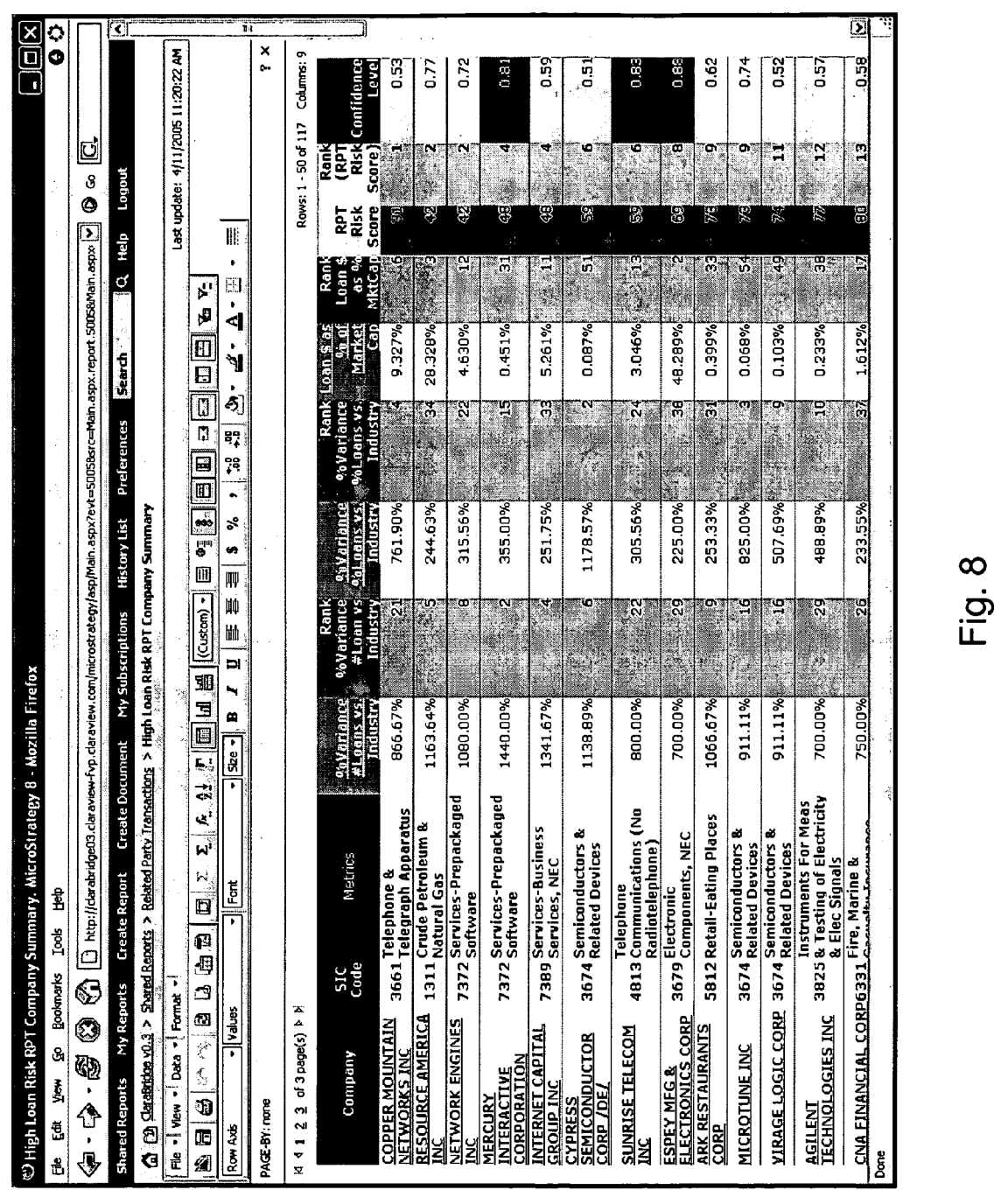
Figure 9:
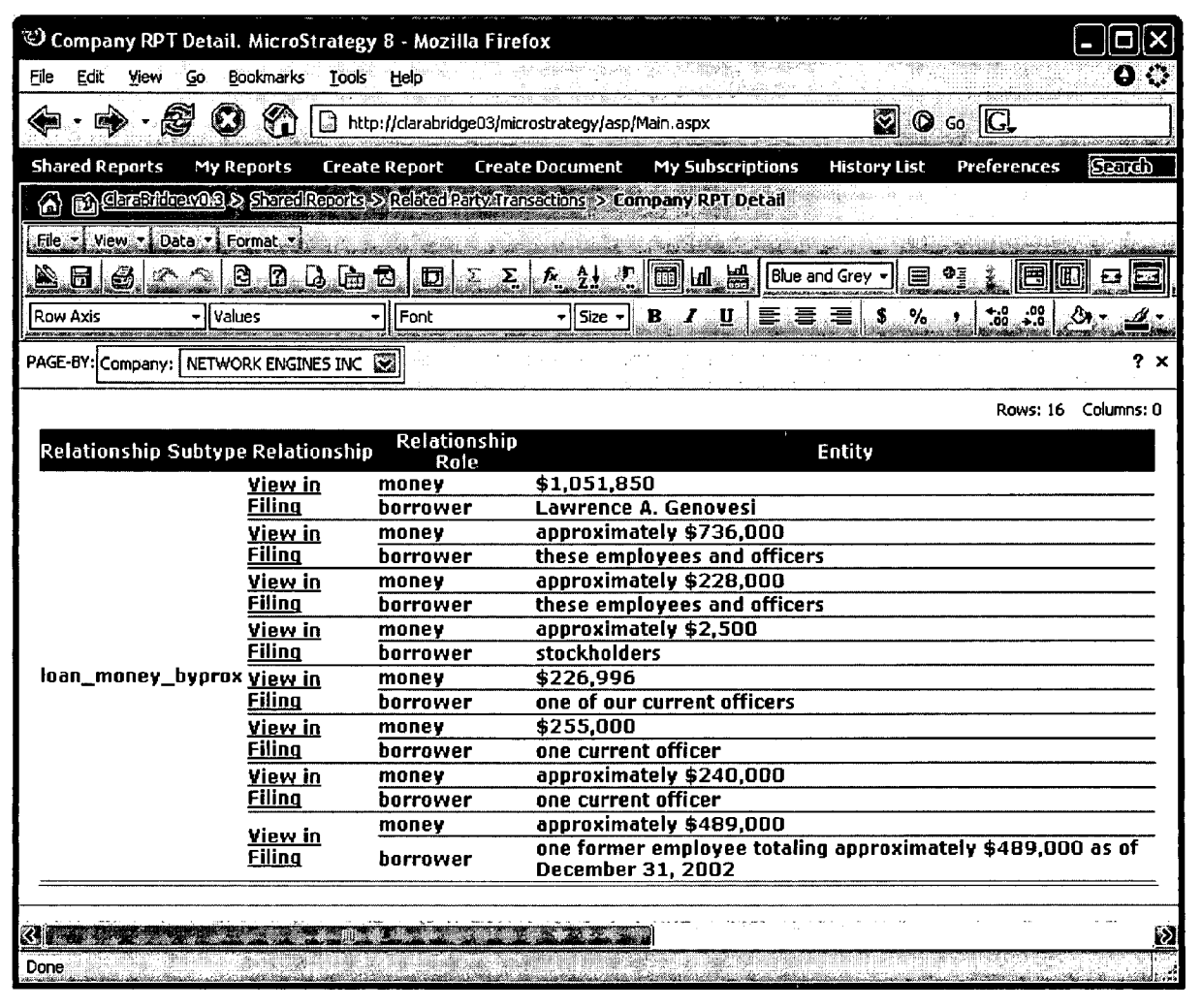
Figure 10:
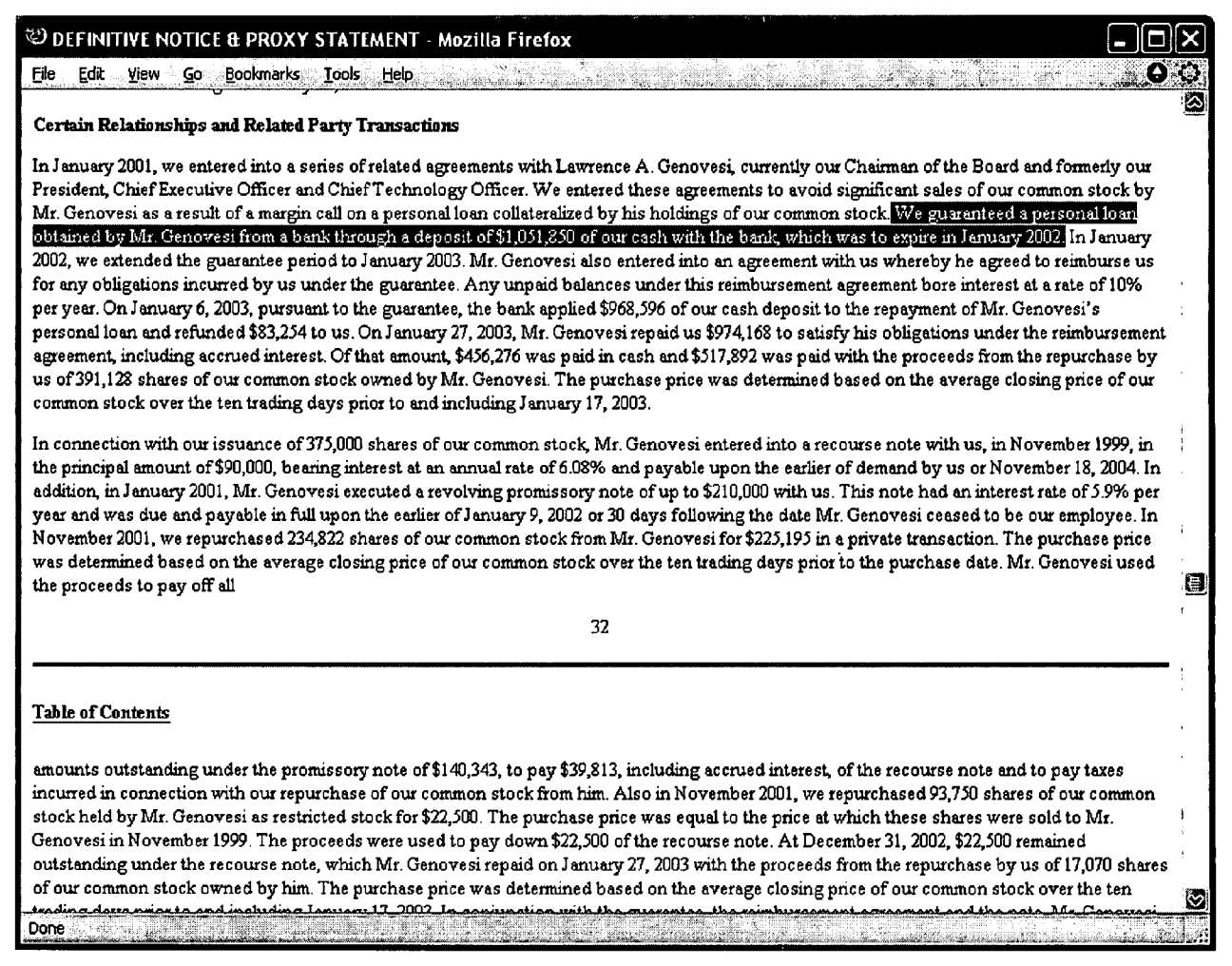

The business intelligence software analyzes the data and presents it using dashboards and reports. For example, the report illustrated in FIG. 6 sorts the companies based on the number of reported transactions, identifying the number of transactions per type of transactions as well as a statistical comparison of the company against the industry average number of transactions. The reports illustrated in FIGS. 7 and 8 focus only on loan transactions, further identifying the industry groups of the individual corporations. This allows the user to determine if a specific industry commonly engages in a particular type of transaction and whether a specific company is behaving differently from its peers. Because the data is structured and linked to the original document, the business intelligence software can identify the recipients and amounts of the loans, FIG. 9, as well as the source text in the original document, FIG. 10. Further, the user can then click on hyperlinks to seamlessly view the original unstructured source to validate the findings.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A system for making unstructured data available to structured data tools comprising:
a core server computer, wherein the core server computer performs steps comprising:
accessing a source of unstructured data;
reading the unstructured data from the source of unstructured data;
sending the unstructured data to one or more transformation tools;
parsing, via a natural-language processing transformation tool, the unstructured data to extract sentences from the unstructured data and then further extract from the extracted sentences sentence-level natural-language processed entities, wherein the sentence-level natural-language processed entities are at least noun phrases;
extracting, via a linguistic processing transformation tool, sentence-level linguistically-processed relationships, wherein the sentence-level linguistically-processed relationships comprise associations between the sentence-level natural-language processed entities;
sending the sentence-level natural-language processed entities and the sentence-level linguistically-processed relationships from the one or more transformation tools to a categorization tool;
determining, via the categorization tool, categorization data elements present in each extracted sentence, wherein the categorization data elements are based on the sentence-level natural-language processed entities and the sentence-level linguistically-processed relationships, and are placed within predetermined categories, and a confidence level for each categorization data element, wherein the confidence level for each categorization data element combines one or more data points linked to the sentence-level natural-language processed entities and the sentence-level linguistically-processed relationships to create a statistically-oriented calculation of confidence assigned to the categorization data element;
outputting the confidence level for at least one of the categorization data elements for use in structured data tools; and
wherein the one or more data points are selected from the group consisting of: confidence score of value provided by the one or more transformation tools, number of relationships found in the source of unstructured data compared to the size of the source of unstructured data, average number of relationships per kilobyte for relationships of the same type as a selected relationship, number of entities found to be associated with a relationship compared to an average number of entities for relationships in a same hierarchy, number of times similar relationships have been found in the past, number of entities that are grouped together to form a master entity, a number of times an entity occurred in the source of unstructured data compared to the average number of occurrences for entities in the same hierarchy, weighted confidences based on hierarchy of a relationship or entity, measures of data extraction confidence integrated with the system via an analysis schema, measures based on a fullness of a relationship's attributes, measures based on the confluence of a same finding by multiple transformation tools, measures based on the source of the unstructured data, and combinations thereof.

2. The system of claim 1, wherein the core server computer further performs a step comprising determining a topic of a section of text, extracting a section of text from a whole document, matching names, or matching addresses.

3. The system of claim 1, wherein the core server computer further performs a step comprising providing data connectors that allow structured data tools to access a structured analysis schema, wherein the structured data tools comprise business intelligence, statistical analysis, data visualization and mapping, or data mining.

4. The system of claim 1, wherein the source of unstructured data comprises email, word processing documents, spreadsheets, presentation materials, PDF files, web pages, news/media reports, case files, transcriptions, file servers, web servers, enterprise content, enterprise search tool repositories, intranets, knowledge management systems, or document management systems.

5. The system of claim 1, wherein the one or more transformation tools comprise: (i) entity, concept and relationship tagging and extraction tools, (ii) data matching tools or, (iii) custom transformation tools.

6. A system for making unstructured data available to structured data tools comprising:
   a core server computer executing at least one software module comprising:
   code to access a source of unstructured data;
   code to read the unstructured data from the source of unstructured data;
   code to write a copy of the unstructured data to a capture schema, wherein the capture schema comprises a set of tables to store the copy of the unstructured data and attributes of the unstructured data;
   code to send the copy of the unstructured data to one or more transformation tools;
   code to parse, via a natural language processing transformation tool, the copy of the unstructured data to extract sentences from the copy of the unstructured data and then further extract from the extracted sentences sentence-level natural-language processed entities, wherein the sentence-level natural-language processed entities are at least noun phrases;
   extracting, via a linguistic processing transformation tool, sentence-level linguistically-processed relationships, wherein the sentence-level linguistically-processed relationships comprise associations between the sentence-level natural-language processed entities;
   code to send the sentence-level natural-language processed entities and the sentence-level linguistically-processed relationships from the one or more transformation tools to a categorization tool;
   code to determine, via the categorization tool, categorization data elements present in each extracted sentence, wherein the categorization data elements based on to the sentence-level natural-language processed entities and the sentence-level linguistically-processed relationships, and are placed within predetermined categories, and a confidence level for each categorization data element, wherein the confidence level for each categorization data element combines one or more data points linked to the sentence-level natural-language processed entities and the sentence-level linguistically-processed relationships to create a statistically-oriented calculation of confidence assigned to the categorization data element;
   code to write the categorization data elements from the categorization tool and the sentence-level natural-language processed entities and the sentence-level linguistically-processed relationships from the one or more transformation tools in a structured database schema;
   code to output the confidence level for at least one of the categorization data elements for use in structured data tools; and
   wherein the one or more data points are selected from the group consisting of: confidence score of value provided by the one or more transformation tools, number of relationships found in the source of unstructured data compared to the size of the source of unstructured data, average number of relationships per kilobyte for relationships of the same type as a selected relationship, number of entities found to be associated with a relationship compared to an average number of entities for relationships in a same hierarchy, number of times similar relationships have been found in the past, number of entities that are grouped together to form a master entity, a number of times an entity occurred in the source of unstructured data compared to the average number of occurrences for entities in the same hierarchy, weighted confidences based on hierarchy of a relationship or entity, measures of data extraction confidence integrated with the system via an analysis schema, measures based on a fullness of a relationship's attributes, measures based on the confluence of a same finding by multiple transformation tools, measures based on the source of the unstructured data, and combinations thereof.

7. The system of claim 6, further comprising code to determine a topic of a section of text, extracting a section of text from a whole document, matching names, or matching addresses.

8. The system of claim 6, further comprising code to provide data connectors that allow structured data tools to access a structured analysis schema, wherein the structured data tools comprise business intelligence, statistical analysis, data visualization and mapping, or data mining.

9. The system of claim 6, wherein the source of unstructured data comprises email, word processing documents, spreadsheets, presentation materials, PDF files, web pages, news/media reports, case files, transcriptions, file servers, web servers, enterprise content, enterprise search tool repositories, intranets, knowledge management systems, or document management systems.

10. The system of claim 6, wherein the one or more transformation tools comprise: (i) entity, concept and relationship tagging and extraction tools, (ii) data matching tools or, (iii) custom transformation tools.

11. A system for extracting unstructured data from a plurality of unstructured data sources and a plurality of formats comprising:
   a core server computer comprising:
   a plurality of application program interfaces (APIs) to interface with the plurality of unstructured data sources;
   a single internal API that interfaces with a plurality of software components that allow structured data tools to operate on unstructured data;
   extraction connectors for processing unstructured data from the unstructured data sources and loading the processed unstructured data into a capture schema, wherein the capture schema comprises a set of tables to store a copy of the unstructured data and attributes of the unstructured data;
   wherein the copy of the unstructured data is sent to one or more transformation tools;
   wherein a natural-language processing transformation tool parses the copy of the unstructured data to extract sentences from the copy of the unstructured data and then further extract from the extracted sentences sentence-level natural-language processed entities, wherein the sentence-level natural-language processed entities are at least noun phrases;
   wherein a linguistic processing transformation tool extracts sentence-level linguistically-processed relationships, wherein the sentence-level linguistically-processed relationships comprise associations between the sentence-level natural-language processed entities;
   wherein the sentence-level natural-language processed entities and the sentence-level linguistically-processed relationships are sent from the one or more transformation tools to a categorization tool;
   wherein the categorization tool determines categorization data elements present in each extracted sentence, wherein the categorization data elements are based on the sentence-level natural-language processed entities and the sentence-level linguistically-processed relationships, and are placed within predetermined categories, and a confidence level for each categorization data element, wherein the confidence level for each categorization data element combines one or more data points linked to the sentence-level natural-language processed entities and the sentence-level linguistically-processed relationships to create a statistically-oriented calculation of confidence assigned to the categorization data element;

wherein the categorization data elements from the categorization tool and the sentence-level natural-language processed entities and the sentence-level linguistically-processed relationships from the one or more transformation tools are written in a structured database schema;

wherein the confidence level for at least one of the categorization data elements is output for use in structured data tools; and wherein the one or more data points are selected from the group consisting of: confidence score of value provided by the one or more transformation tools, number of relationships found in the source of unstructured data compared to the size of the source of unstructured data, average number of relationships per kilobyte for relationships of the same type as a selected relationship, number of entities found to be associated with a relationship compared to an average number of entities for relationships in a same hierarchy, number of times similar relationships have been found in the past, number of entities that are grouped together to form a master entity, a number of times an entity occurred in the source of unstructured data compared to the average number of occurrences for entities in the same hierarchy, weighted confidences based on hierarchy of a relationship or entity, measures of data extraction confidence integrated with the system via an analysis schema, measures based on a fullness of a relationship's attributes, measures based on the confluence of a same finding by multiple transformation tools, measures based on the source of the unstructured data, and combinations thereof.

12. The system of claim 11, wherein the plurality of unstructured data sources comprises email, word processing documents, spreadsheets, presentation materials, PDF files, web pages, news/media reports, case files, transcriptions, file servers, web servers, enterprise content, enterprise search tool repositories, intranets, knowledge management systems, and document management systems.

13. A system comprising:
a core server computer executing at least one software module comprising:
code capable of understanding the format of data provided by a transformation tool;
code to convert the data provided by a transformation tool to a data format that maps to a data capture schema, the data capture schema comprising a set of tables to store a copy of unstructured data and attributes of the unstructured data;
code to send the copy of the unstructured data to one or more transformation tools;
code to parse, via a natural-language processing transformation tool, the copy of the unstructured data to extract sentences from the copy of the unstructured data and then further extract from the extracted sentences sentence-level natural-language processed entities, wherein the sentence-level natural-language processed entities are at least noun phrases;

code to extract, via a linguistic processing transformation tool, sentence-level linguistically-processed relationships, wherein the sentence-level linguistically-processed relationships comprise associations between the sentence-level natural-language processed entities;

code to send the sentence-level natural-language processed entities and the sentence-level linguistically-processed relationships from the one or more transformation tools to a categorization tool;

wherein the categorization tool determines categorization data elements present in each extracted sentence, wherein the categorization data elements are based on the sentence-level natural-language processed entities and the sentence-level linguistically-processed relationships, and are placed within predetermined categories, and a confidence level for each categorization data element, wherein the confidence level for each categorization data element combines one or more data points linked to the sentence-level natural-language processed entities and the sentence-level linguistically-processed relationships to create a statistically-oriented calculation of confidence assigned to the categorization data element;

code to write the categorization data elements from the categorization tool and the sentence-level natural-language processed entities and the sentence-level linguistically-processed relationships from the one or more transformation tools in a structured database schema;

code to output the confidence level for at least one of the categorization data elements for use in structured data tools;

wherein each of a plurality of source documents are assigned a unique key that identifies an individual source document throughout a software system allowing (i) cross-analysis, (ii) linking of results for further analysis, (iii) drill-down from analytical reports back to the source document or (iv) drill-down from analytical reports back to transformation information stored in the data capture schema; and wherein the one or more data points are selected from the group consisting of: confidence score of value provided by the one or more transformation tools, number of relationships found in the source of unstructured data compared to the size of the source of unstructured data, average number of relationships per kilobyte for relationships of the same type as a selected relationship, number of entities found to be associated with a relationship compared to an average number of entities for relationships in a same hierarchy, number of times similar relationships have been found in the past, number of entities that are grouped together to form a master entity, a number of times an entity occurred in the source of unstructured data compared to the average number of occurrences for entities in the same hierarchy, weighted confidences based on hierarchy of a relationship or entity, measures of data extraction confidence integrated with the system via an analysis schema, measures based on a fullness of a relationship's attributes, measures based on the confluence of a same finding by multiple transformation tools, measures based on the source of the unstructured data, and combinations thereof.

14. The system of claim 13, wherein the one or more transformation tools comprise: (i) entity, concept and relationship tagging and extraction tools, (ii) data matching tools or, (iii) custom transformation tools.

15. The system of claim 13, wherein the code to convert the data comprises at least one XSL transform.

16. A system for allowing parallel processing of unstructured data on a continuous real-time basis, the system comprising:
- a core server computer executing at least one software module comprising:
- code to configure unstructured source extractors and treat them as black boxes in a data workflow;
- code to read unstructured data from a plurality of data sources and source systems, wherein the unstructured data is available as input for further processing;
- code to configure end-to-end data flow from the plurality of data sources through one or more transformation components into a capture schema, wherein the capture schema comprises a set of tables to store a copy of the unstructured data and attributes of the unstructured data;
- code to send the copy of the unstructured data to one or more transformation tools;
- code to parse, via a natural-language processing transformation tool, the copy of the unstructured data to extract sentences from the copy of the unstructured data and then further extract from the extracted sentences sentence-level natural-language processed entities, wherein the sentence-level natural-language processed entities are at least noun phrases;
- code to extract, via a linguistic processing transformation tool, sentence-level linguistically-processed relationships, wherein the sentence-level linguistically-processed relationships comprise associations between the sentence-level natural-language processed entities;
- code to send the sentence-level natural-language processed entities and the sentence-level linguistically-processed relationships from the one or more transformation tools to a categorization tool;
- code to determine, via the categorization tool, categorization data elements present in each extracted sentence, wherein the categorization data elements are based on the sentence-level natural-language processed entities and the sentence-level linguistically-processed relationships, and are placed within predetermined categories, and a confidence level for each categorization data element, wherein the confidence level for each categorization data element combines one or more data points linked to the sentence-level natural-language processed entities and the sentence-level linguistically-processed relationships to create a statistically-oriented calculation of confidence assigned to the categorization data element;
- code to write the categorization data elements from the categorization tool and the sentence-level natural-language processed entities and the sentence-level linguistically-processed relationships from the one or more transformation tools in a structured database schema;
- code to output the confidence level for at least one of the categorization data elements for use in structured data tools; and
- wherein the one or more data points are selected from the group consisting of: confidence score of value provided by the one or more transformation tools, number of relationships found in the source of unstructured data compared to the size of the source of unstructured data, average number of relationships per kilobyte for relationships of the same type as a selected relationship, number of entities found to be associated with a relationship compared to an average number of entities for relationships in a same hierarchy, number of times similar relationships have been found in the past, number of entities that are grouped together to form a master entity, a number of times an entity occurred in the source of unstructured data compared to the average number of occurrences for entities in the same hierarchy, weighted confidences based on hierarchy of a relationship or entity, measures of data extraction confidence integrated with the system via an analysis schema, measures based on a fullness of a relationship's attributes, measures based on the confluence of a same finding by multiple transformation tools, measures based on the source of the unstructured data and combinations thereof.

17. The system of claim 16, wherein the at least one software module uses a drag and drop data editor.

18. A system that allows structured data analysis tools to analyze data in an analysis schema comprising:
- a core server computer executing at least one software module comprising:
- ODBC code;
- JDBC code;
- code to pre-populate metadata of the structured data analysis tools with tables, columns, attributes, data and metrics from an analysis schema without performing tool customization or application specific setup; and
- wherein the analysis schema comprises a set of tables that provides structure to unstructured data, wherein at least one of the set of tables comprises master entities, the master entities comprising (i) a group of entities that appear in multiple documents that are the same actual entity, (ii) entities that are spelled differently that are the same actual entity, or (iii) entities that have multiple names that are the same actual entity;
- wherein unstructured data is read from a source of unstructured data;
- wherein a copy of the unstructured data is written to a capture schema, wherein the capture schema comprises a set of tables to store the copy of the unstructured data and attributes of the unstructured data;
- wherein the copy of the unstructured data is sent to one or more transformation tools;
- wherein a natural-language processing transformation tool parses the copy of the unstructured data to extract sentences from the copy of the unstructured data and then further extract from the extracted sentences sentence-level natural-language processed entities, wherein the sentence-level natural-language processed entities are at least noun phrases;
- wherein a linguistic processing transformation tool extracts sentence-level linguistically-processed relationships, wherein the sentence-level linguistically-processed relationships comprise associations between the sentence-level natural-language processed entities;
- wherein the sentence-level natural-language processed entities and the sentence-level linguistically-processed relationships are sent from the one or more transformation tools to a categorization tool;
- wherein the categorization tool determines categorization data elements present in each extracted sentence, wherein the categorization data elements are based on the sentence-level natural-language processed entities and the sentence-level linguistically-processed relationships, and are placed within predetermined categories, and a confidence level for each categorization data element, wherein the confidence level for each categorization data element combines one or more data points linked to the sentence-level natural-language processed entities and the sentence-level linguistically-processed relationships to create a statistically-oriented calculation of confidence assigned to the categorization data element;

wherein the categorization data elements from the categorization tool and the sentence-level natural-language processed entities and the sentence-level linguistically-processed relationships from the one or more transformation tools are written in a structured database schema;

wherein the confidence level for at least one of the categorization data elements is output for use in structured data tools; and wherein the one or more data points are selected from the group consisting of: confidence score of value provided by the one or more transformation tools, number of relationships found in the source of unstructured data compared to the size of the source of unstructured data, average number of relationships per kilobyte for relationships of the same type as a selected relationship, number of entities found to be associated with a relationship compared to an average number of entities for relationships in a same hierarchy, number of times similar relationships have been found in the past, number of entities that are grouped together to form a master entity, a number of times an entity occurred in the source of unstructured data compared to the average number of occurrences for entities in the same hierarchy, weighted confidences based on hierarchy of a relationship or entity, measures of data extraction confidence integrated with the system via an analysis schema, measures based on a fullness of a relationship's attributes, measures based on the confluence of a same finding by multiple transformation tools, measures based on the source of the unstructured data, and combinations thereof.

19. The system of claim 18, wherein the core server computer further comprises pre-built reports, graphs and dashboards.

20. The system of claim 18, wherein the core server computer further comprises embedded hyperlinks that allow drill-through to underlying data sources.

21. The system of claim 20, wherein the hyperlinks comprise a document ID, entity ID, or relationship ID from the analysis schema.

22. The system of claim 21, wherein the core server computer further comprises a source highlighter, wherein the source highlighter accesses the capture schema and retrieves a source document or a section of a source document.

23. The system of claim 22, wherein the source highlighter retrieves start and end character positions, and scrolls down and highlights a relevant sentence in a retrieved source document or in a retrieved section of a source document.

24. The system of claim 1, further comprising providing the categories from the categorization tool and the sentence-level natural-language processed entities and the sentence-level linguistically-processed relationships from the one or more transformation tools to a user on a visual display.

25. The system of claim 6, further comprising code to provide the categories from the categorization tool and the sentence-level natural-language processed entities and the sentence-level linguistically-processed relationships from the one or more transformation tools to a user on a visual display.

26. The system of claim 11, wherein the categories from the categorization tool and the sentence-level linguistically-extracted entities and the sentence-level natural-language processed entities and the sentence-level linguistically-processed relationships from the one or more transformation tools to a user on a visual display.

27. The system of claim 13, wherein the categories from the categorization tool and the sentence-level natural-language processed entities and the sentence-level linguistically-processed relationships from the one or more transformation tools to a user on a visual display.

28. The system of claim 16, wherein the categories from the categorization tool and the sentence-level natural-language processed entities and the sentence-level linguistically-processed relationships from the one or more transformation tools to a user on a visual display.

29. The system of claim 18, wherein the categories from the categorization tool and the sentence-level natural-language processed entities and the sentence-level linguistically-processed relationships from the one or more transformation tools to a user on a visual display.

30. The system of claim 1, wherein the confidence level is assigned to individual categorization data elements.

31. The system of claim 1, further comprising a proximity transformer, wherein the proximity transformer searches for the sentence-level natural-language processed entities and the sentence-level linguistically-processed relationships separated by a certain distance.

32. The system of claim 31, wherein the proximity transformer creates proximity relationships.

33. The system of claim 1, further comprising writing a copy of the unstructured data to a capture schema, wherein the capture schema comprises a set of tables to store the copy of the unstructured data and attributes of the unstructured data.

34. The system of claim 1, further comprising writing the categorization data elements from the categorization tool and the sentence-level natural-language processed entities and the sentence-level linguistically-processed relationships from the one or more transformation tools in a structured database schema.

35. The system of claim 1, wherein the at least one noun phrases are physical objects, abstract objects or concepts.

* * * * *